US012447866B2

(12) United States Patent
Roebuck et al.

(10) Patent No.: US 12,447,866 B2
(45) Date of Patent: Oct. 21, 2025

(54) THERMAL MANAGEMENT OF ELECTRICAL ENERGY STORAGE PACK OF A VEHICLE

(71) Applicant: Textron Inc., Providence, RI (US)

(72) Inventors: Trevor Douglas Roebuck, Evans, GA (US); Robert Charles Bradley, Augusta, GA (US); Patrick Dwaine Warden, Evans, GA (US); Donny Hammond, Augusta, GA (US)

(73) Assignee: Textron Inc., Providence, RI (US)

( * ) Notice: Subject to any disclaimer, the term of this patent is extended or adjusted under 35 U.S.C. 154(b) by 729 days.

(21) Appl. No.: 17/724,806

(22) Filed: Apr. 20, 2022

(65) Prior Publication Data
US 2022/0340044 A1  Oct. 27, 2022

Related U.S. Application Data

(60) Provisional application No. 63/177,697, filed on Apr. 21, 2021.

(51) Int. Cl.
*B60L 58/27* (2019.01)
*B60H 1/00* (2006.01)
(Continued)

(52) U.S. Cl.
CPC .......... *B60L 58/27* (2019.02); *B60H 1/00557* (2013.01); *B60H 1/143* (2013.01);
(Continued)

(58) Field of Classification Search
None
See application file for complete search history.

(56) References Cited

U.S. PATENT DOCUMENTS 5,647,534 A   7/1997   Kelz et al.
6,029,762 A * 2/2000   Kepner .................. B60L 50/66
                                                                 180/68.5
(Continued)

FOREIGN PATENT DOCUMENTS

CN   201457641 U   5/2010
CN   107946498 A   4/2018
(Continued)

OTHER PUBLICATIONS

Polaris, Inc.; "2015-2022 Ranger EV Mid-Size Battery Care Basics", https://www.polaris.com/en-us/off-road/owner-resources/help-center/article/KA-01300/; Dec. 22, 2022, pp. 1-10.
(Continued)

*Primary Examiner* — Rexford N Barnie
*Assistant Examiner* — Joel Barnett
(74) *Attorney, Agent, or Firm* — BainwoodHuang

(57) ABSTRACT

Techniques involve utilizing a ducting system for an electric vehicle. The ducting system includes a motor housing constructed and arranged to house at least a portion of an electric propulsion motor of the electric vehicle. The ducting system further includes a storage pack housing coupled with the motor housing, the storage pack housing being constructed and arranged to house at least a portion of an electrical energy storage pack that supplies electric power to the electric propulsion motor. The ducting system further includes a fluid control assembly constructed and arranged to control fluid flow between the motor housing and the storage pack housing.

22 Claims, 21 Drawing Sheets

(51) Int. Cl.
*B60H 1/14* (2006.01)
*H01M 10/617* (2014.01)
*H01M 10/625* (2014.01)

(52) U.S. Cl.
CPC ....... *H01M 10/617* (2015.04); *H01M 10/625* (2015.04); *B60L 2240/545* (2013.01); *H01M 2220/20* (2013.01)

(56) References Cited

U.S. PATENT DOCUMENTS

| | | | |
|---|---|---|---|
| 7,400,111 B2 | 7/2008 | Kishibata et al. | |
| 8,122,989 B2 | 2/2012 | Burchett et al. | |
| 8,827,023 B2 | 9/2014 | Masuda et al. | |
| 8,851,153 B2 | 10/2014 | Park et al. | |
| 8,919,481 B2 | 12/2014 | Matsuda | |
| 9,022,152 B2 | 5/2015 | Imamura et al. | |
| 9,096,133 B2 | 8/2015 | Kohler et al. | |
| 9,216,637 B2 | 12/2015 | Crain et al. | |
| 9,643,514 B2 | 5/2017 | Matsuda | |
| 9,660,236 B2 | 5/2017 | Kondo et al. | |
| 9,975,425 B2 | 5/2018 | Monfette et al. | |
| 9,978,999 B2 | 5/2018 | Ikeuchi et al. | |
| 10,011,324 B2 | 7/2018 | Inoue | |
| 10,300,971 B2 | 5/2019 | Holroyd et al. | |
| 10,573,863 B2 | 2/2020 | Sweazey et al. | |
| 10,603,997 B2 | 3/2020 | Bergstrom et al. | |
| 10,981,470 B2 | 4/2021 | Milton et al. | |
| 10,992,007 B2 | 4/2021 | Kohda | |
| 11,059,351 B2 | 7/2021 | Zenner et al. | |
| 11,097,607 B2 | 8/2021 | Hirukawa et al. | |
| 11,104,384 B2 | 8/2021 | Kinsman et al. | |
| 2006/0036883 A1* | 2/2006 | Hashizumi | B60L 58/26 713/300 |
| 2013/0233634 A1 | 9/2013 | Matsuda | |
| 2013/0327581 A1* | 12/2013 | Foos | B60K 11/06 454/75 |
| 2015/0291054 A1* | 10/2015 | Duan | H01M 10/625 429/50 |
| 2015/0329175 A1* | 11/2015 | Inoue | B60K 1/04 307/10.1 |
| 2015/0380785 A1 | 12/2015 | Takeuchi et al. | |
| 2016/0229282 A1 | 8/2016 | Hettrich et al. | |
| 2018/0272877 A1 | 9/2018 | Sakowshi et al. | |
| 2018/0370384 A1 | 12/2018 | Murakami et al. | |
| 2020/0076029 A1 | 3/2020 | Litz | |
| 2021/0184288 A1* | 6/2021 | Janarthanam | H01M 10/663 |
| 2022/0017181 A1* | 1/2022 | Suzuki | B60L 50/66 |
| 2022/0069386 A1* | 3/2022 | Salonen | H01M 10/425 |
| 2022/0080857 A1 | 3/2022 | Kim et al. | |
| 2022/0097511 A1 | 3/2022 | Wang et al. | |
| 2022/0153111 A1 | 5/2022 | Tatsuwaki et al. | |
| 2022/0161630 A1 | 5/2022 | Lindquist et al. | |
| 2022/0219782 A1 | 7/2022 | Bruneau et al. | |
| 2022/0219784 A1 | 7/2022 | Bruneau et al. | |
| 2022/0250715 A1 | 8/2022 | Leblanc | |
| 2022/0306222 A1 | 9/2022 | Deckard et al. | |

FOREIGN PATENT DOCUMENTS

| | | |
|---|---|---|
| CN | 111993883 A | 11/2020 |
| CN | 212685467 U | 3/2021 |
| CN | 216101966 U | 3/2022 |
| CN | 115214334 A | 10/2022 |
| DE | 102011012447 A1 | 9/2011 |
| DE | 202018105262 U1 | 10/2018 |

OTHER PUBLICATIONS

Electric GT; "Battery System (25_35_50 kWH Tesla Enclosures)—Electric GT", https://electricgt.com/shop/electric-gt-battery-systems/; pp. 1-5.

Electric GT; "High Voltage Junction Boxes", https://electricgt.com/shop/high-voltage-junction-boxes/; pp. 1-3.

JS Golf Carts; "Lithium Batteries for Your Golf Cart", https://jsgolfcarts.com/blog/lithium-batteries-golf-cart/; pp. 1-3.

Coremax Technology; "Coremax 72V 100AH Lithium Battery Pack", https://www.coremax-tech.com/product/72-volt-golfcart-batteries-pack-for-sale-lifepo4-72v-100ah-golf-cart-lithium-ion-battery pack/; pp. 1-2.

Shelly, et al.; "Evaluation of Heat Pumping and Waste Heat Recovery for Battery Electric Vehicle Thermal Management", International Refrigeration and Air Conditioning Conference 2021, https://docs.lib.purdue.edu/cgi/viewcontent.cgi?article=3218&context=iracc, pp. 1-10.

Yang, et al.; "Recent Advances on Air Heating System of Cabin for Pure Electric Vehicles; A Review", Heliyon 8 (2022) E11032, Science Direct; https://www.sciencedirect.com/science/article/pii/S2405844022023209/ pdfft?md5=ad2f8fdb525f4d3e1e0b42c931916d5f&pid=1-s2.0-S2405844022023209-main.pdf pp. 1-11.

Ahn, et al.; "High Performance Characteristics of a Dual Source Heat Pump Using Air and Waste Heat in Electric Vehicles", Applied Energy 119 (2014), Science Direct, https://www.sciencedirect.com/science/article/pii/S0306261914000051, pp. 1-9.

Tian, et al.; "Performance Evaluation of an Electric Vehicle Thermal Management System With Waste Heat Recovery", Applied Thermal Engineering 169 (2020) 114979, Science Direct, https://www.sciencedirect.com/science/article/pii/S1359431119357242, pp. 1-11.

Ayarturk, et al.; "New Heating System Devleopment Working With Waste Heat for Electric Vehicles", Transportation Research Procedia 14 (2016) 1080-1086, Science Direct, https://www.sciencedirect.com/science/article/pii/S2352146516301806/ pdf?md5=5c812db8e9c00381da3254e168336b65&pid=1-s2.0-S2352146516301806-main.pdf&_valck=1, pp. 1080-1086.

* cited by examiner

THERMAL MANAGEMENT OF ELECTRICAL ENERGY STORAGE PACK OF A VEHICLE

CROSS REFERENCE TO RELATED APPLICATIONS

This is a regular utility patent application of earlier-filed U.S. Application No. 63/177,697, filed on Apr. 21, 2021, and entitled "Electric Snowmobile with Thermal Management of Electrical Energy Storage Pack", the contents and teachings of which are hereby incorporated by reference in their entirety.

BACKGROUND

Snowmobiles are popular land vehicles used as transportation vehicles or as recreational vehicles in cold and snowy conditions. Generally, snowmobiles are available for various applications such as deep snow, high performance, luxury touring, and trail riding, for example.

In general, a snowmobile has a chassis on or around which the various components of the snowmobile are assembled. Typical snowmobiles include one or more skis for steering, a seat, handlebars, and an endless track for propulsion mounted to a central chassis. An internal combustion engine drives a ground-engaging endless track disposed in a longitudinally extending drive tunnel. The skis serve to facilitate steering as well as to provide flotation of the front of the snowmobile over the snow in which it is operated. A handlebar assembly, positioned forward of the seat, is operatively linked to the skis for steering the snowmobile. The skis may be pivoted to steer the snowmobile, for example, by turning the handlebars.

SUMMARY

An electric snowmobile may include an electric motor and an electrical energy storage pack (or battery pack). For example, an electric motor may be put in place of an internal combustion engine found in conventional snowmobiles. Additionally, an electrical energy storage pack may be put in place of the fuel tank found in the conventional snowmobiles.

The energy capacity of electrical energy storage packs tends to decrease at lower temperatures because chemical reaction rates within elements of the electrical energy storage packs tend to decrease at lower temperatures. Since snowmobiles are typically operated in environments that are near or below 0° C., the operating range of an electric snowmobile may be reduced if the electrical energy storage pack gets too cold. In addition, charging efficiency may be reduced or charging may be prevented altogether if the electrical energy storage pack gets too cold. Therefore, a means of improving the energy capacity of the electrical energy storage pack and thus the operating range of an electric snowmobile is desired.

Improved techniques involve providing thermal management to an electrical energy storage pack of a vehicle. Along these lines, fluid flow is controlled between an electric motor housing and an electrical energy storage pack housing. The electric motor housing houses (or contains) at least a portion of an electric motor of the vehicle, and the electrical energy storage pack housing houses an electrical energy storage pack of the vehicle. During vehicle operation and in accordance with certain embodiments, fluid (gas or liquid) is directed through the electric motor housing to capture heat from the electric motor and is further directed through the electrical energy storage pack housing to deliver the captured heat to the electrical energy storage pack. Accordingly, such controlled fluid flow is able to raise the temperature of the electrical energy storage pack using heat from the electric motor thus improving performance of the electrical energy storage pack as well as the operating range of the vehicle.

One embodiment is directed to a ducting system for a vehicle. The ducting system includes a housing constructed and arranged to house at least a portion of a motor of the vehicle. The ducting system further includes a storage pack housing coupled with the motor housing, the storage pack housing being constructed and arranged to house at least a portion of an electrical energy storage pack that supplies electric power to the vehicle. The ducting system further includes a fluid control assembly constructed and arranged to control fluid flow between the motor housing and the storage pack housing.

Another embodiment is directed to an electric vehicle. The electric vehicle includes an electric propulsion motor constructed and arranged to provide vehicle propulsion using electric power. The electric vehicle further includes an electrical energy storage pack constructed and arranged to supply electric power to the electric propulsion motor. The electric vehicle further includes a ducting system coupled with the electric propulsion motor and the electrical energy storage pack. The ducting system includes a motor housing constructed and arranged to house at least a portion of the electric propulsion motor. The ducting system further includes a storage pack housing coupled with the motor housing, the storage pack housing being constructed and arranged to house at least a portion of the electrical energy storage pack. The ducting system further includes a fluid control assembly constructed and arranged to control fluid flow between the motor housing and the storage pack housing.

Another embodiment is directed to a ducting system for an electric vehicle. The ducting system includes a motor housing constructed and arranged to house at least a portion of an electric propulsion motor of the electric vehicle, and a storage pack housing coupled with the motor housing. The storage pack housing is constructed and arranged to house at least a portion of an electrical energy storage pack that supplies electric power to the electric propulsion motor. The ducting system further includes a fluid control assembly constructed and arranged to control fluid flow between the motor housing and the storage pack housing.

Another embodiment is directed to an electric vehicle which includes an electric propulsion motor constructed and arranged to provide snowmobile propulsion using electric power, an electrical energy storage pack constructed and arranged to supply electric power to the electric propulsion motor, and a ducting system coupled with the electric propulsion motor and the electrical energy storage pack. The ducting system includes a motor housing constructed and arranged to house at least a portion of the electric propulsion motor, a storage pack housing coupled with the motor housing, the storage pack housing being constructed and arranged to house at least a portion of the electrical energy storage pack, and a fluid control assembly constructed and arranged to control fluid flow between the motor housing and the storage pack housing.

Yet another embodiment is directed to a method of operating an electric vehicle. The method includes storing charge in an electrical energy storage pack of the electric vehicle, supplying charge from the electrical energy storage pack to an electric propulsion motor that provides snowmobile propulsion, and providing fluid flow from the electric propulsion motor to the electrical energy storage pack to allow waste heat from the electric propulsion motor to warm the electrical energy storage pack.

In some arrangements, the electric vehicle further includes an electric snowmobile drive track (or endless track) coupled with the motor enabling the electric vehicle to operate over terrain as an electric snowmobile. Other features may further contribute to providing the electric vehicle with a snowmobile form factor, e.g., front skis (or runners), aerodynamic body panels, an elongated frame configured to support snowmobile components, etc.

In some arrangements, the motor housing and the storage pack housing of the ducting system form a plenum extending from the electric propulsion motor to the electrical energy storage pack. Additionally, the fluid control assembly of the ducting system includes a set of doors disposed along the plenum.

In some arrangements, the fluid control assembly further includes a set of controllers coupled with the set of doors. The set of controllers is constructed and arranged to operate the set of doors.

In some arrangements, the set of controllers includes a central controller constructed and arranged to transition at least some of the set of doors between open and closed positions in response to sensed temperature within the plenum. In some arrangements, the set of controllers includes door-specific controllers constructed and arranged to transition respective doors of the set of doors between open and closed positions in response to sensed temperature within the plenum. In some arrangements, the set of controllers includes one or more central controllers for some doors, and one or more door-specific controllers for one or more other doors.

In some arrangements, the ducting system further includes a forward-facing intake vent constructed and arranged to channel air that is initially outside the snowmobile into the motor housing as the snowmobile moves forward.

In some arrangements, the set of doors includes an intake door coupled with the forward-facing intake vent. The intake door is constructed and arranged to control airflow through the forward-facing intake vent.

In some arrangements, the set of controllers includes a controller constructed and arranged to operate the intake door in response to sensed temperature within a motor space defined by the motor housing.

In some arrangements, the set of doors includes an intermediate door disposed along the plenum between the motor housing and the storage pack housing. The intermediate door is constructed and arranged to control airflow between a motor space defined by the motor housing and a storage pack space defined by the storage pack housing.

In some arrangements, the set of controllers includes a controller constructed and arranged to operate the intermediate door in response to sensed temperature within the storage pack housing.

In some arrangements, the set of doors includes a motor vent door coupled with the motor housing. The motor vent door is constructed and arranged to exhaust airflow from a motor space defined by the motor housing.

In some arrangements, the set of controllers includes a controller constructed and arranged to operate the motor vent door in response to sensed temperature within the motor housing.

In some arrangements, the set of doors includes a storage pack vent door coupled with the storage pack housing. The storage pack vent door is constructed and arranged to exhaust airflow from a storage pack space defined by the storage pack housing.

In some arrangements, the set of controllers includes a controller constructed and arranged to operate the storage pack vent door in response to sensed temperature within the storage pack housing.

In some arrangements, the electric vehicle further includes a set of removable thermal insulation sections. Each removable thermal insulation section is constructed and arranged to install along at least a portion of the plenum to minimize heat loss along the plenum when the removable thermal insulation section is installed.

In some arrangements, the electric vehicle further includes heating equipment disposed within the storage pack housing. The heating equipment is constructed and arranged to maintain a temperature of the electrical energy storage pack above a predefined low temperature threshold and below a predefined high temperature threshold.

In some arrangements, the electrical energy storage pack includes battery units. Additionally, the heating equipment includes zone elements coupled with respective battery units of the electrical energy storage pack, and control circuitry that individually operates the zone elements to maintain temperature uniformity among the battery units.

In some arrangements, the heating equipment is constructed and arranged to draw electrical power from the electrical energy storage pack when the electrical energy storage pack is being recharged from an external power supply. Additionally, the heating equipment is constructed and arranged to draw electrical power from the electrical energy storage pack when the electrical energy storage pack is not being recharged from an external power supply and the electrical energy storage pack has a state of charge that exceeds a predefined threshold. Furthermore, the heating equipment is constructed and arranged to draw electrical power from an auxiliary electrical port when electrical power is available from the auxiliary electrical port.

In some arrangements, the electric vehicle further includes an umbilical port constructed and arranged to electrically connect with a donor snowmobile, and tethering control circuitry coupled with the electrical port. The tethering control circuitry is constructed and arranged to electrically disconnect the electrical energy storage pack from the electric propulsion motor when the electrical port electrically connects with the donor snowmobile and the donor snowmobile provides electric power to the electric propulsion motor through the umbilical port.

Other embodiments are directed to higher and lower level systems, assemblies, apparatus, processing circuits, etc. Some embodiments are directed to various processes, components, and mechanisms which are involved in thermal management of an electrical energy storage pack of a vehicle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
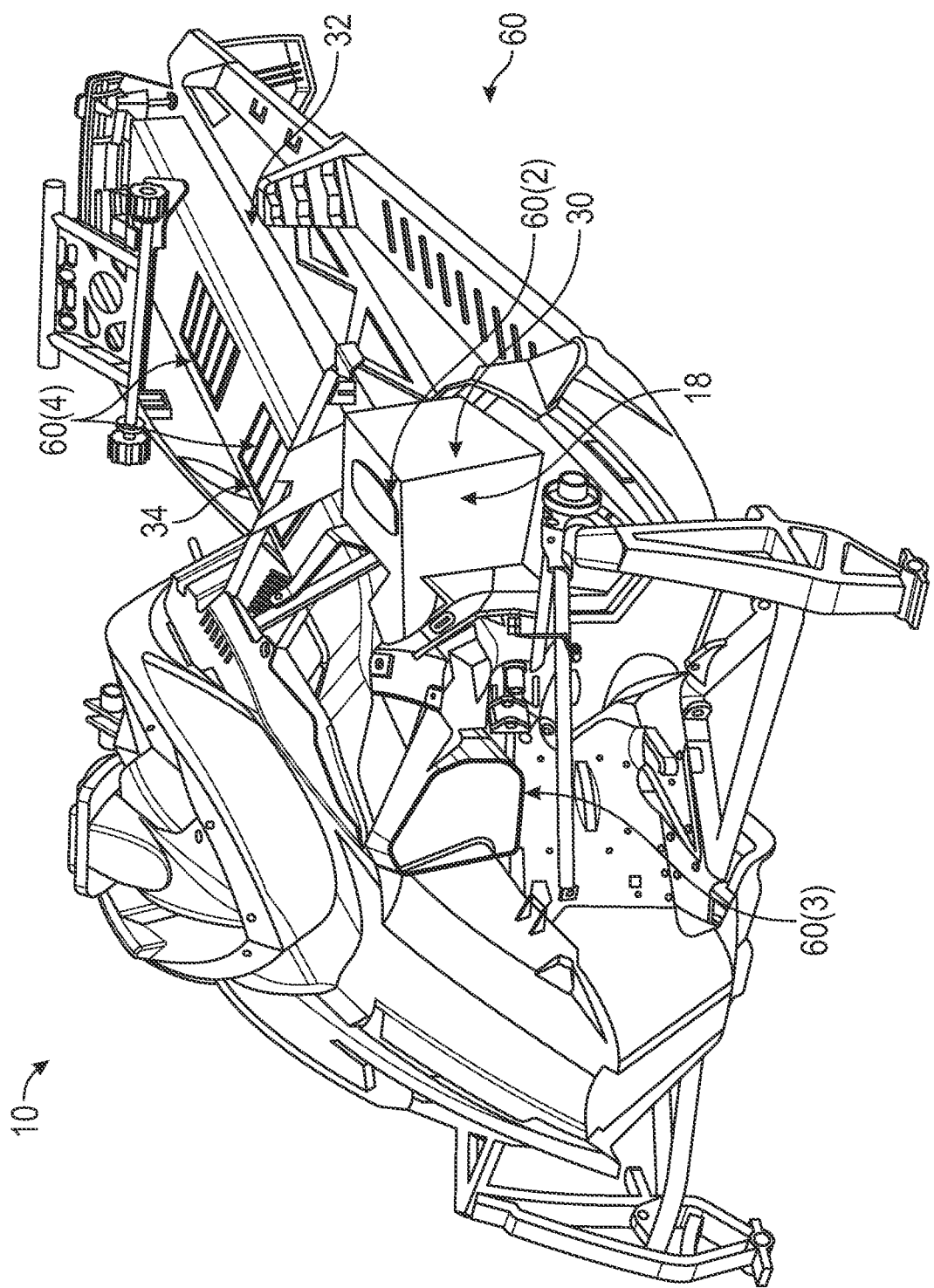
FIG. 1 is a cutaway perspective view of an electric vehicle in accordance with certain embodiments.
Figure 2:
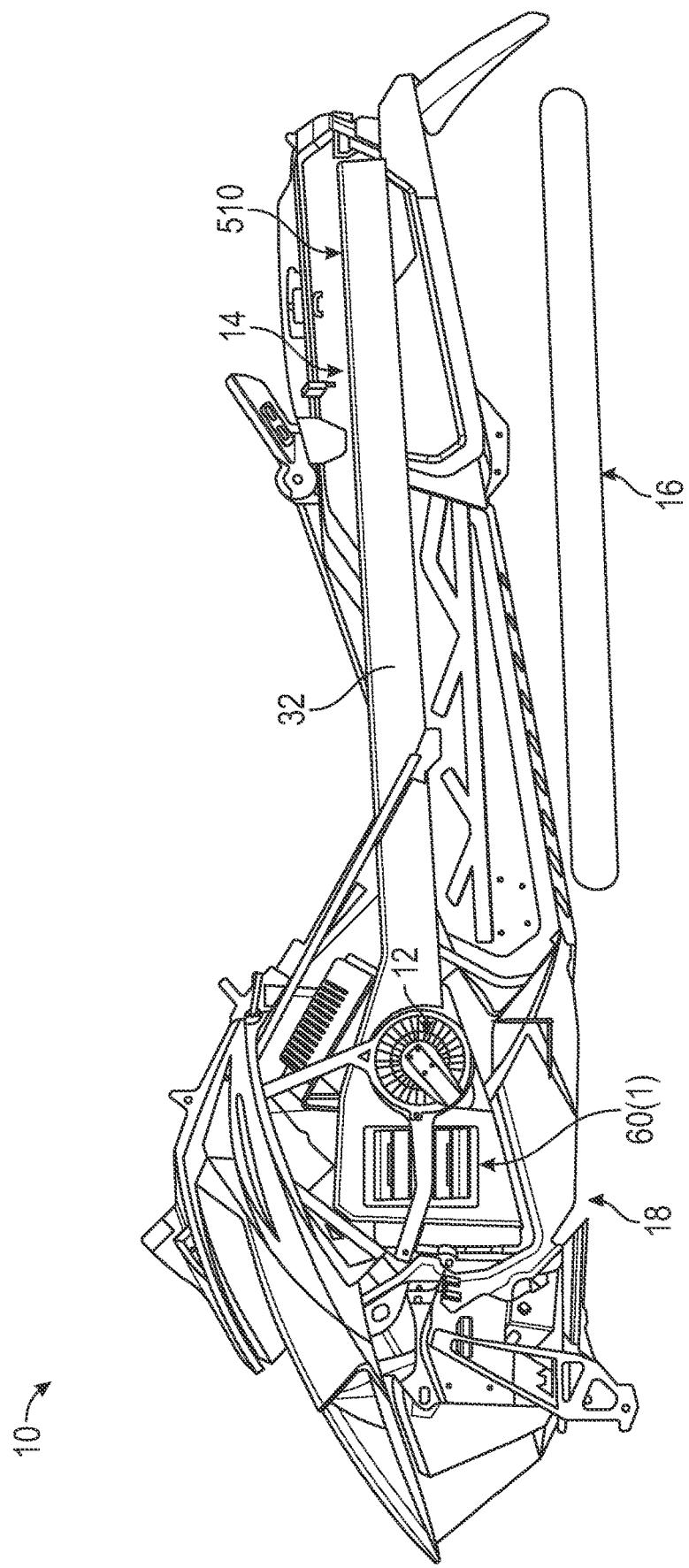
FIG. 2 is a cutaway side view of the electric vehicle in accordance with certain embodiments.
Figure 3:
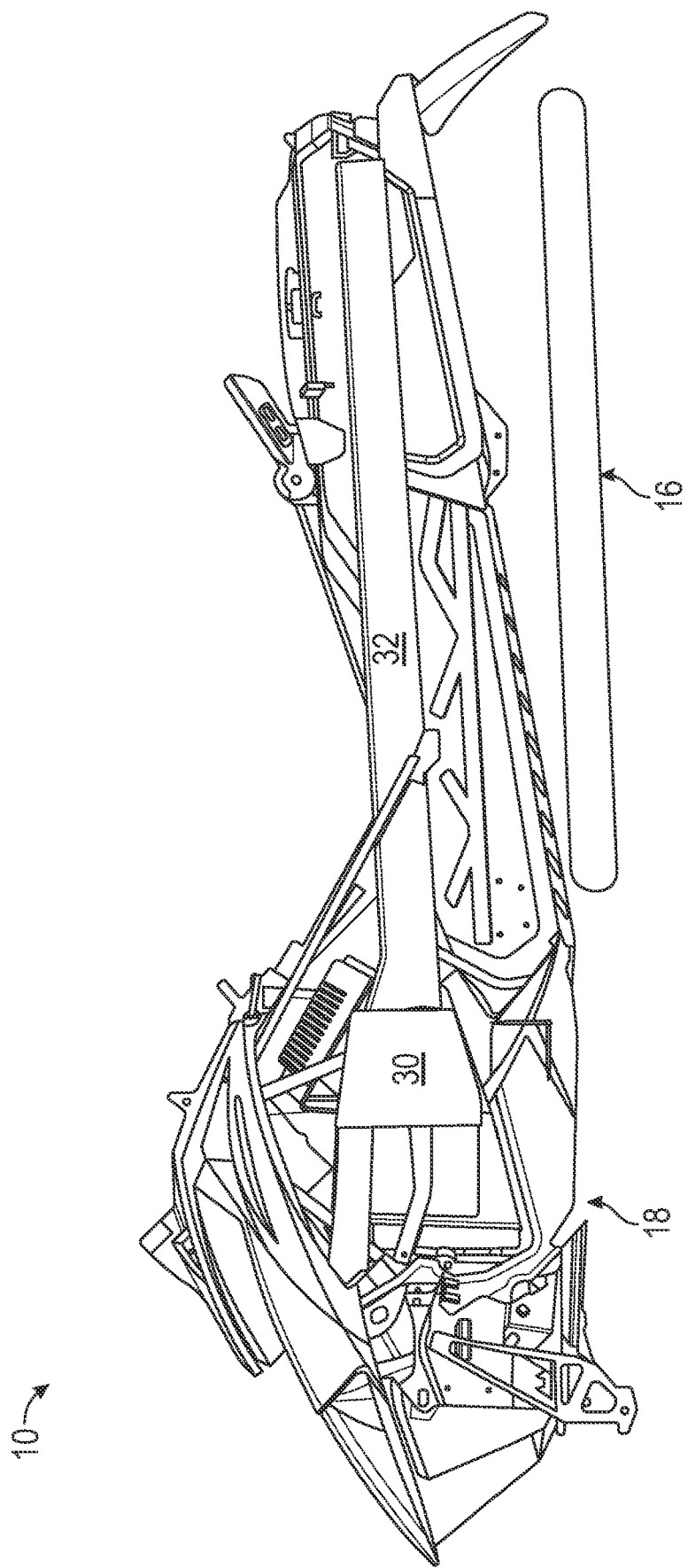
FIG. 3 is another cutaway side view of the electric vehicle in accordance with certain embodiments.
Figure 4:
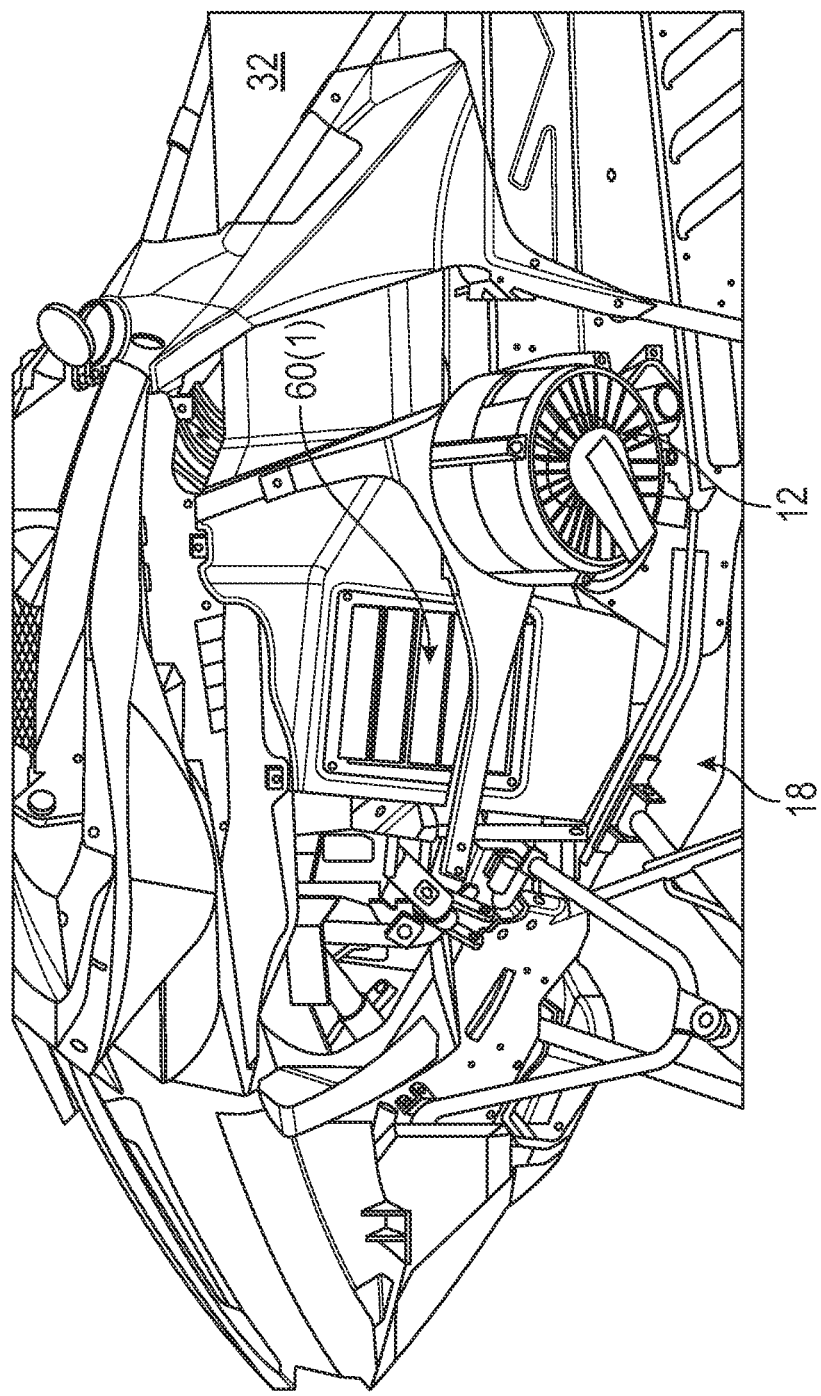
FIG. 4 is another cutaway side view of the electric vehicle in accordance with certain embodiments.
Figure 5:
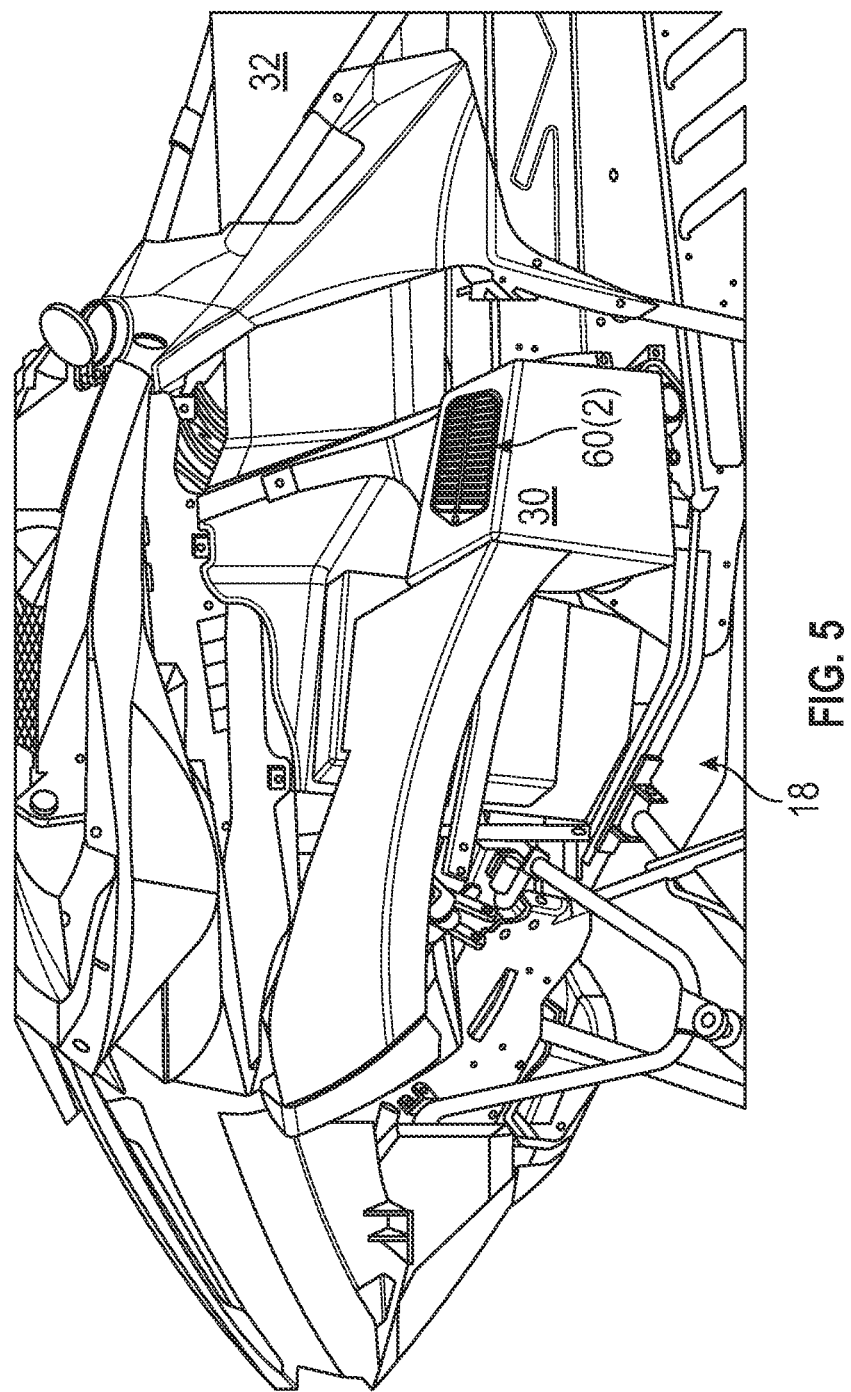
FIG. 5 is another cutaway side view of the electric vehicle in accordance with certain embodiments.

Improved techniques involve providing thermal management to an electrical energy storage pack of a vehicle. In particular, fluid flow is controlled between an electric motor housing and an electrical energy storage pack housing. The electric motor housing houses (or encases) at least a portion of an electric motor of the vehicle, and the electrical energy storage pack housing houses an electrical energy storage pack of the vehicle. During vehicle operation, fluid (gas or liquid) is capable of being directed through the electric motor housing to capture heat from the electric motor and further directed through the electrical energy storage pack housing to deliver the captured heat to the electrical energy storage pack. Accordingly, such controlled fluid flow is able to raise the temperature of the electrical energy storage pack using heat from the electric motor thus improving the electric power storage capacity of the electrical energy storage pack as well as the operating range of the vehicle.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

FIGS. 1-6 show a vehicle 10 which performs thermal management of an electrical energy storage pack in accordance with certain embodiments. By way of example, the vehicle 10 is described below as an electric snowmobile that utilizes various thermal management improvements to cope with certain cold weather conditions/environments. However, the vehicle 10 may have other form factors, uses, applications, etc. Moreover, other vehicle types include personal transport vehicles, golf cars, food and beverage vehicles, hospitality vehicles, all-terrain vehicles (ATVs), utility task vehicles (UTVs), motorcycles, scooters, vehicles for specialized applications, other lightweight ground vehicles and utility vehicles, as well as water craft and air craft.

As shown in FIGS. 1-6, the electric snowmobile 10 includes an electric propulsion motor 12 (hereinafter referred to as the motor 12), an electrical energy storage pack 14 (hereinafter referred to as the storage pack 14), a drive track 16, and a ducting system 18.

The motor 12 is electrically coupled with the storage pack 14, and mechanically coupled with the drive track 16. The motor 12 may be may be an AC motor or a DC motor, and is constructed and arranged to turn the drive track 16 using electric power from the electrical energy storage pack 14 to deliver propulsive power to propel the electric snowmobile 10.

The storage pack 14 may be, or include, a battery assembly containing a plurality of rechargeable battery cells, e.g., Li-Ion cells, and is constructed and arranged to store electric power. In accordance with certain embodiments, the storage pack 14 may receive charge from an external source via a charge port. Also, in accordance with certain embodiments, the storage pack 14 may receive charge from the motor 12 via regenerative braking.

The drive track 16 couples with the motor 12 (e.g., via linkage, a gear set, combinations thereof, etc.), and supports the electric snowmobile 10 over a lower surface (e.g., snow, ice, ground, etc.). The drive track 16 is able to move the electric snowmobile 10 (e.g., forward or backward) in response to drive from the motor 12. Additionally, the drive track 16 is able to slow the electric snowmobile 10 in response to braking torque from the motor 12.

The ducting system 18 includes a motor housing 30, a storage pack (or battery) housing 32, and a fluid control assembly 34. The motor housing 30 is constructed and arranged to house (or encase) at least a portion of the motor 12. The storage pack housing 32 is coupled with the motor housing 30, and is constructed and arranged to house (or encase) at least a portion of the storage pack 14. The fluid control assembly 34 is coupled with the motor housing 30 and the storage pack housing 32, and is constructed and arranged to control fluid flow between the motor housing 30 and the storage pack housing 32.

Figure 6:
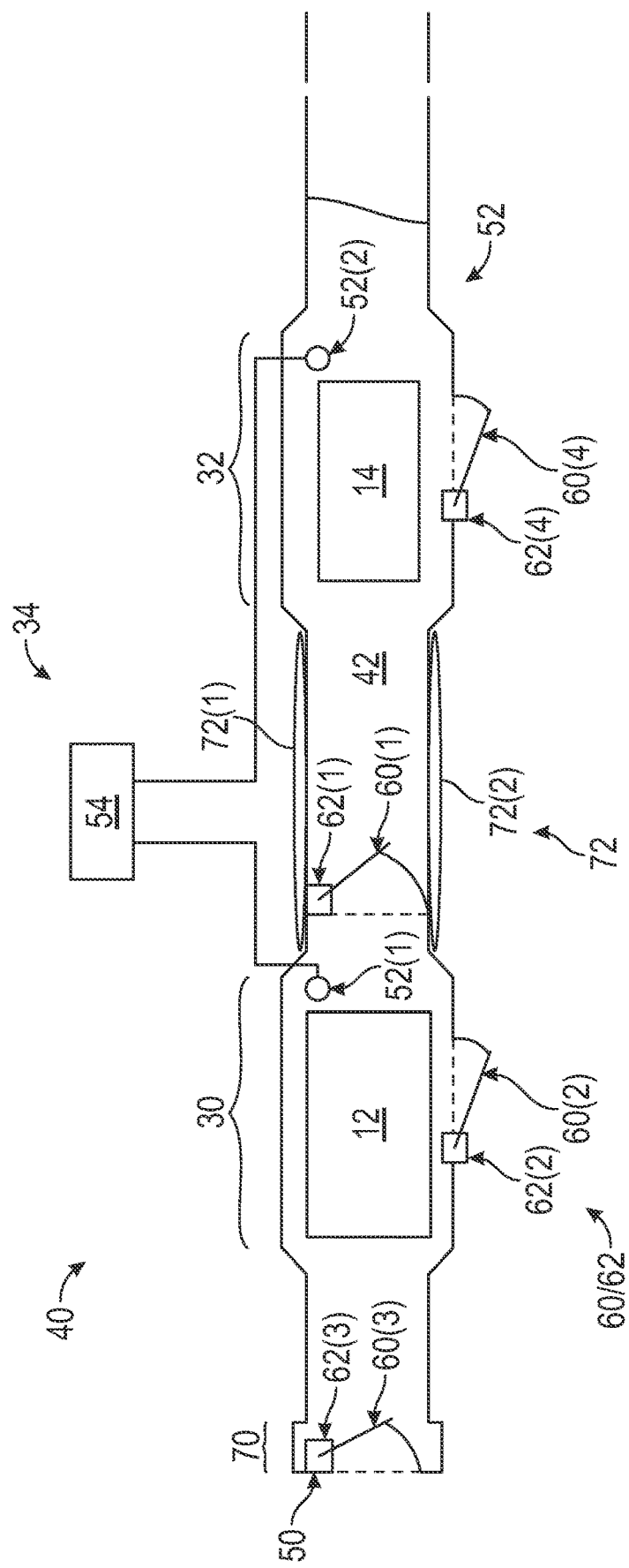
FIG. 6 is a diagrammatical view of at least a portion of a plenum of the electric vehicle in accordance with certain embodiments.

As best seen in the diagrammatical view 40 in FIG. 6, the motor housing 30 and the storage pack housing 32 form a portion of a plenum (or fluid flow space) 42 that extends through and along the motor housing 30 and the storage pack housing 32. Although the diagrammatical view 40 shows the plenum 42 as an overall left to right straight run extending across the motor 12 and the storage pack 14 for simplicity, it should be understood that the plenum 42 does not need to be straight. Rather, all or one or more portions of the plenum 42 may not be straight, but instead include one or more angles, bends, tapers, wider sections, narrower sections, combinations thereof, etc. (also see FIGS. 1-5). Moreover, the walls defining the plenum 42 may provide various cross-sectional shapes such as rectangles, ovals, surfaces, protrusions, irregular shapes and/or transitions, combinations thereof, and so on to accommodate other geometries of the electric snowmobile such as other internal componentry (e.g., body panels, the frame, suspension components, drive components, etc.), an external streamline body profile, symmetry along the snowmobile body, and so on.

The fluid control assembly 34 includes a set of fluid control devices 50, a set of sensors 52, and a set of electronic controllers 54 which couples with the set of fluid control devices 50 and the set of sensors 52. The set of fluid control devices 50 is constructed and arranged to modify (or control) fluid movement through the plenum 42. The set of sensors 52 is constructed and arranged to measure fluid characteristics (e.g., temperature) within the plenum 42 and output a set of sensing signals to the set of electronic controllers 54. The set of electronic controllers 54 is constructed and arranged to output a set of control signals to the set of fluid control devices 50 to control the operation of the set of fluid control devices 50.

The motor housing 30 is in fluid communication with the storage pack housing 32. As used herein, fluid communication means that fluid (e.g., air) can flow between the motor housing 30 and the storage pack housing 32. In accordance with certain embodiments, the fluid control assembly 34 is configured to allow waste heat generated during operation of the motor 12 in the motor housing 30 to be ducted to the storage pack housing 32 when a temperature of the storage pack 14 falls below a lower temperature threshold, e.g., 0° C., thereby warming the storage pack 14 to keep it within a preferred operating temperature range. The set of fluid control devices 50 may include air movement devices, such as fans, air doors such as louvers, shutters, vanes, or iris apertures, other control surfaces, combinations thereof, etc. to allow or inhibit airflow. Along these lines, a fluid control device 50 includes a door 60 and an actuator 62 that controls opening and closing of the door 60.

In some arrangements, an air door 60 is capable of being actuated along a range of motion (e.g., along a full range of motion between a fully opened position and a fully closed position, along a sub-range of the full range of motion, etc.) by a respective electro-mechanical actuator 62 (i.e., the door 60 is actuatable) in response to a control signal. In other arrangements, the air door 60 is operated by a non-electrically controlled actuator 62 such as a bimetallic spring. Some arrangements may include a combination of one or more electrically actuated doors 60 and one or more non-electrically controlled doors 60.

In accordance with certain embodiments, a thermal control system of the fluid control assembly 34 includes an electronic controller 54 interconnected to a thermal sensor 52(1) located in the motor housing 30 and/or a thermal sensor 52(2) located in the storage pack housing 32. This electronic controller 54 may be a stand-alone controller or may be integrated into another electronic controller, such as a battery monitoring system or a motor controller. The thermal control system also includes a first actuator 62(1) configured to operate a first vent door 60(1) between the motor housing 30 and the storage pack housing 32. The first vent door 60(1) is configured to allow or inhibit airflow between the motor housing 30 and the storage pack housing 32. For example, the first vent door 60(1) may include vanes, louvers, or an iris aperture that is controlled by the electronic controller 54 based on data from one or more of the thermal sensors 50. While the motor 12 is operated, waste heat from the motor 12 raises the air temperature within the motor housing 30. When the controller 54 determines that a temperature within the storage pack housing 32 has fallen below a lower temperature threshold, e.g., 0° C., the controller 54 commands the actuator 62(1) to open the first vent door 60(1) between the motor housing 30 and the storage pack housing 32, thereby allowing air warmed by waste heat generated by the operation of the motor 12 to enter the storage pack housing 32 and warm the storage pack 14 before exiting the plenum 42 (e.g., via an output vent). Alternatively, the actuator 62(1) may be a bimetallic spring that is configured to open the first vent door 60(1) as the temperature within the motor housing 30 rises. In some arrangements, thermal convection is relied upon to move the warmed air from the motor housing 30 into the storage pack housing 32 because that does not require any additional energy to be withdrawn from the storage pack 14. However, other embodiments may be envisioned that include fans or other air movement devices to force induction of the warmed air from the motor housing 30 to the storage pack housing 32.

In accordance with certain embodiments, the thermal control system includes a second actuator 62(2) that is configured to operate a second vent door 60(2) between the motor housing 30 that allows hot air warmed by the waste heat from the motor 12 to be ducted from the motor housing 30 to the atmosphere when the controller 54 detects that a temperature of the motor 12 or air in the motor housing 30 rises above a motor temperature threshold, e.g., 90° C. Alternatively, the actuator 62(2) may be a bimetallic spring that is configured to open the second vent door 60(2) as the temperature within the motor housing 30 rises. In some embodiments, the waste heat released to the atmosphere may be directed toward the snowmobile rider to provide a more comfortable riding environment. Thermal convection may be relied upon to move warmed air from the motor housing 30 because that does not require any additional energy to be withdrawn from the storage pack 14. Forced induction may also be provided by a forward-facing intake vent 70 on or in front of the motor housing 30 that collects air as the snowmobile 10 moves forward. The thermal control system may include a third actuator 62(3) configured to operate a third vent door 60(3) on the forward-facing intake vent 70 to regulate temperature within the motor housing 30.

Because excessive temperature within the energy storage housing 20 may be detrimental to performance of the storage pack 14, in an embodiment, the thermal control system includes a fourth actuator 62(4) configured to operate a fourth vent door 60(4) on the storage pack housing 32 that is configured to allow air in the storage pack housing 32 that is warmed by waste heat from the storage pack 14 to be ducted from the storage pack housing 32 to the atmosphere when the controller 54 detects that a temperature of the storage pack 14 rises above an upper temperature threshold, e.g., 10° C. Alternatively, the fourth actuator 62(4) may be a bimetallic spring that is configured to open the fourth vent door 60(4) as the temperature within the energy storage housing 20 rises. If the storage pack housing 32 is located beneath a seat of the snowmobile (not shown), this excess heat may be ducted to help warm the seat.

In accordance with certain embodiments, one or more portions of the plenum 42 is provisioned with thermal insulation sections 72(1), 72(2), . . . (collectively, thermal insulation 72) to minimize heat loss from the storage pack 14 and to provide maximum available heat from the motor 12, as needed. The thermal insulation 72 may be configured to be removable from the regions (e.g., walls) along the plenum 42 to accommodate operation of the snowmobile 10 in warmer environments.

With the doors 60 individually controlled by respective actuators 62, the fluid control assembly 34 is capable of providing rich and reliable thermal management. Along these lines, one or more doors 60 may reside in an opened position while one or more doors 60 reside in a closed position to achieve certain thermal management results that optimize operation of the electric snowmobile 10. In some arrangements, the fluid control assembly 34 includes one or more other fluid control assemblies 34 (e.g., one or more other doors 60, one or more other actuators 62, etc.) or adjust the location of one or more of the existing fluid control assemblies 34 to modify or further augment the thermal management capabilities of the snowmobile 10.

Figure 7:
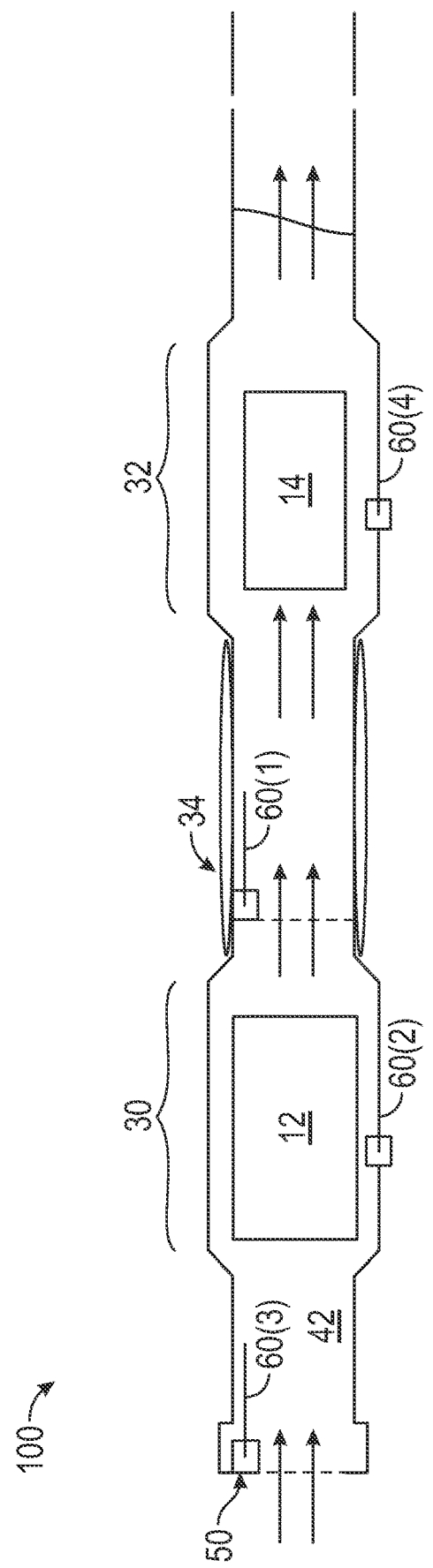
FIG. 7 is another diagrammatical view of at least a portion of the plenum of the electric vehicle in accordance with certain embodiments.
Figure 8:
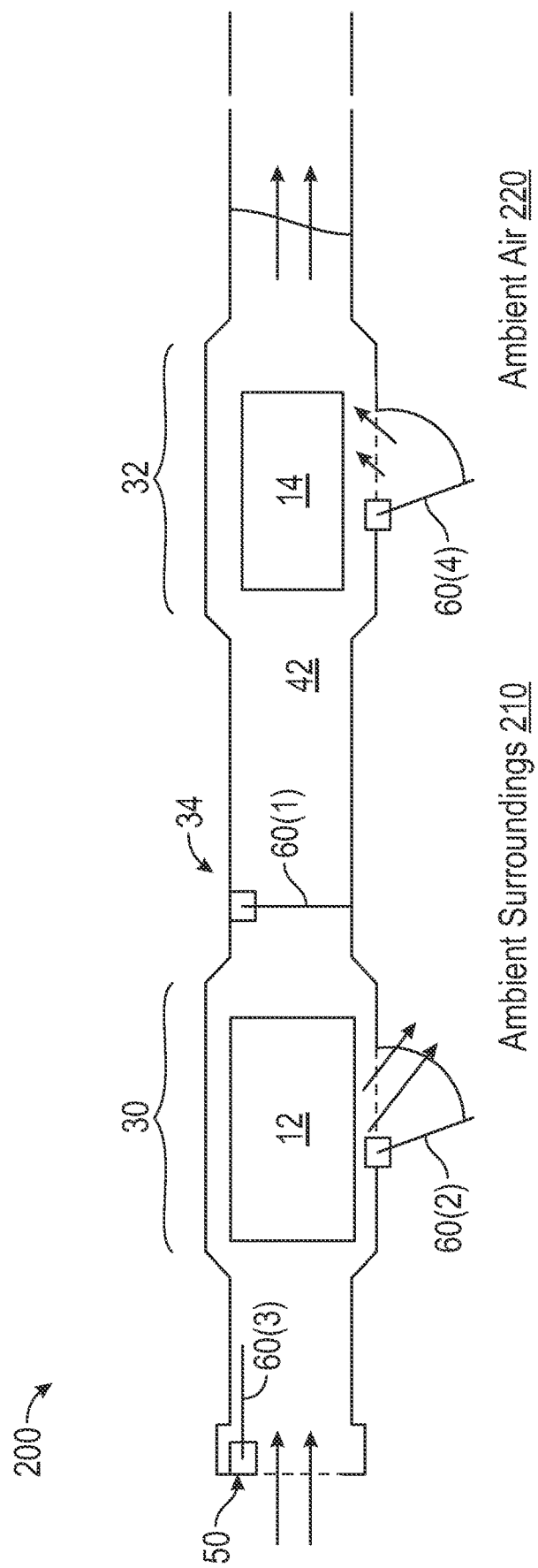
FIG. 8 is another diagrammatical view of at least a portion of the plenum of the electric vehicle in accordance with certain embodiments.

FIGS. 7 and 8 show different example thermal management configurations 100, 200 which may be provided by the fluid control assembly 34. Other thermal management configurations are achievable as well.

As shown in FIG. 7, the thermal management configuration 100 involves the fluid control assembly 34 directing waste heat from the motor 12 to the storage pack 14 to improve operation of the storage pack 14. In particular, the doors 60(1), 60(3) are open while the doors 60(2), 60(4) are closed. Accordingly, air flows into the intake vent 70 and into the motor housing 30 over at least a portion of the motor 12. As a result, the air in the motor housing 30 captures waste heat from the motor 12.

Additionally, the air in the motor housing 30 passes from the motor housing 30 into the storage pack housing 32 where the waste heat in the air warms the storage pack 14 before exiting the plenum 42. Accordingly, the waste heat from the motor 12 is used to raise the temperature of the storage pack 14 thus improving the electric power storage capacity of the storage pack 14 as well as the operating range of the snowmobile 10.

In some arrangements, the air in the storage pack housing 32 exits the plenum 42 through an output vent. For example, the air may exit the plenum 42 by or under the snowmobile seat to warm the seat. In some arrangements, the opening of the output vent remains always open. In other arrangements, the opening of the output vent is controlled by a fluid control device 50 (e.g., a door 60 and an actuator 62). In yet other arrangements, the plenum 42 terminates at the fluid control device 50 having the door 60(4) such that the door opening serves as the end of the plenum 42.

As shown in FIG. 8, the thermal management configuration 200 involves the fluid control assembly 34 releasing waste heat from the motor 12 to the ambient surroundings 210 (e.g., when the storage pack 14 does not require heating to improve operation). In particular, the doors 60(2), 60(3), and 60(4) are open while the door 60(1) is closed. Accordingly, air flows into the intake vent 70 and then into the motor housing 30 over at least a portion of the motor 12. As a result, the air in the motor housing 30 captures waste heat from the motor 12.

However, since the door 60(1) to the storage pack housing 32 is closed and the door 60(3) to the ambient surroundings 210 is open, the air in the motor housing 30 escapes from the plenum 42 before reaching the storage pack housing 32. In some arrangements, the air escaping through the opened door 60(3) reaches an area adjacent the operator to provide warmth to the operator.

Additionally, ambient air 220 (e.g., air from sides of the snowmobile 10) is allowed to enter the storage pack housing 32 before exiting the plenum 42 (e.g., through an output vent). Such operation may be useful for various reasons such as removing heat from the storage pack housing 32, reducing drag, and so on. In some arrangements, the air entering the storage pack housing 32 through the area of the opened door 60(4) and then from the storage pack housing 32 escapes through an output vent (e.g., by or under the snowmobile seat).

By way of example, the thermal insulation 70 is omitted in the thermal management configuration 200 of FIG. 8 to further illustrate flexibility of the snowmobile 10. Along these lines, there may be situations in which transferring warmth from the motor 12 to the storage pack 14 is less impactful, and the thermal insulation 70 (also see FIG. 6) may be removed and thus reduce vehicle weight, drag, etc.

Figure 9:
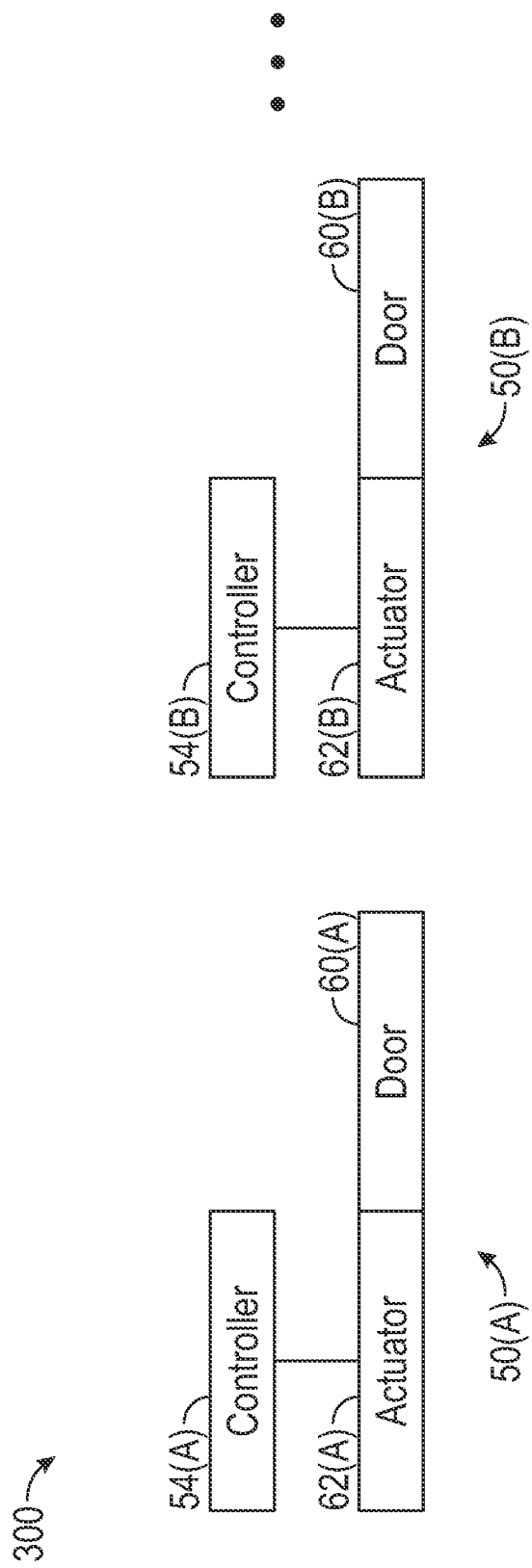
FIG. 9 is a block diagram of controller configuration for the electric vehicle in accordance with certain embodiments.
Figure 10:
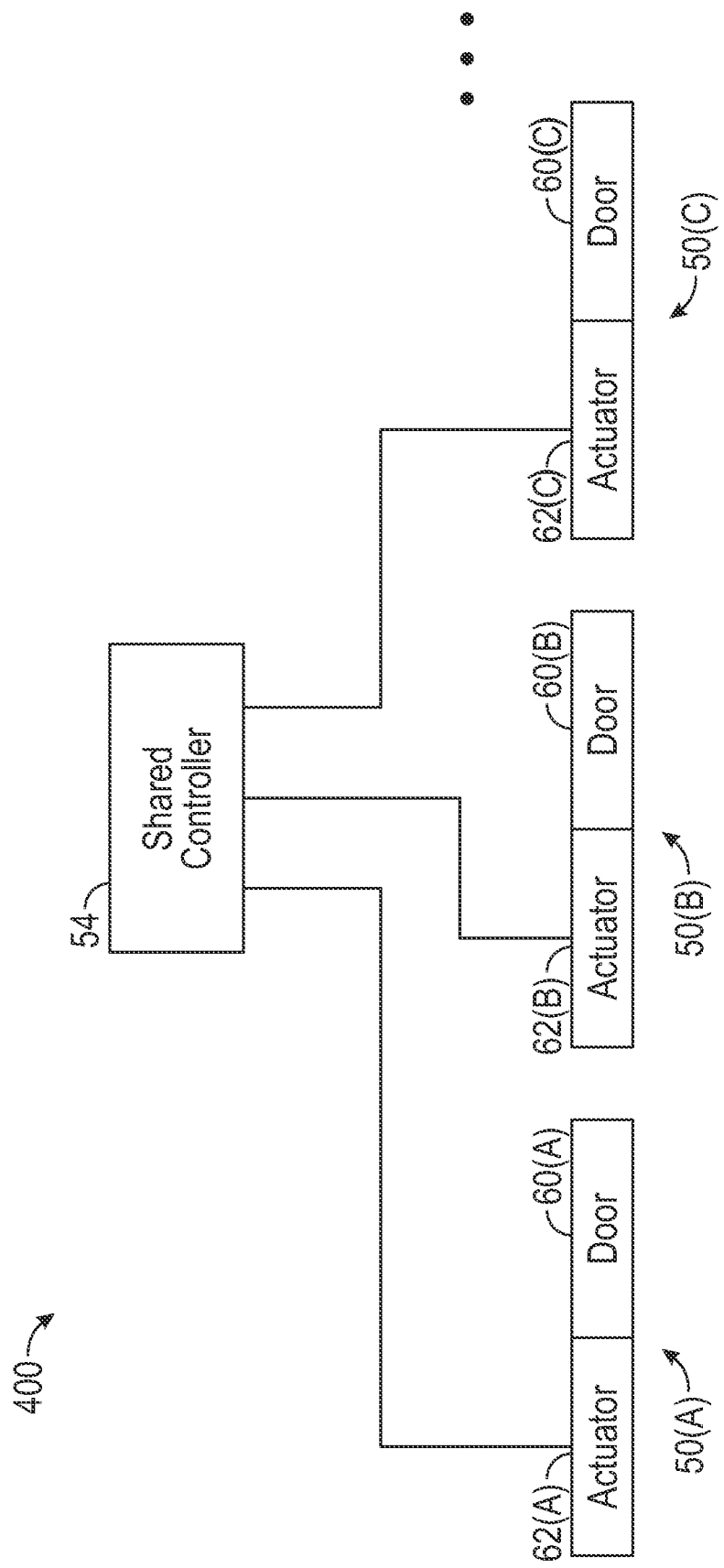
FIG. 10 is a block diagram of another controller configuration for the electric vehicle in accordance with certain embodiments.

FIGS. 9 and 10 show different control configurations 300, 400 for the fluid control assembly 34. FIG. 9 shows a control configuration 300 in which the fluid control devices 50 are individually controlled by respective electronic controllers 54. FIG. 10 shows an electronic controller configuration 400 in which the fluid control devices 50 are controlled by a shared (or central) electronic controller 54.

As shown in FIG. 9, the electronic controller configuration 300 includes a first fluid control device 50(1) having a door 60(1) and an actuator 62(1) coupled with the door 60(1), a second fluid control device 50(2) having a door 60(2) and an actuator 62(2) coupled with the door 60(2), and so on.

In the electronic controller configuration 300, the fluid control devices 50 are electronically controlled by different controllers 54. That is, a controller 54(1) controls the fluid control device 50(1), another controller 54(2) controls the fluid control device 50(2), and so on. Such a configuration 300 may be appropriate when the motor 12 is operated by a motor controller, and the storage pack 14 includes a set of rechargeable battery units which is operated by a battery management system (BMS) that is separate from the motor controller. In such a situation, the motor controller may form the controller 54(A) to control the fluid control device 50(1) which is adjacent the motor housing 30, while the BMS forms the controller 54(B) to control the fluid control device 50(1) which is adjacent the storage pack housing 32.

As shown in FIG. 10, the electronic controller configuration 400 includes a first fluid control device 50(1) having a door 60(1) and an actuator 62(1) coupled with the door

60(1), a second fluid control device 50(2) having a door 60(2) and an actuator 62(2) coupled with the door 60(2), and so on.

However, in contrast to the configuration 300, the fluid control devices 50 of the configuration 400 are electronically controlled by the same controller 54. That is, a controller 54 controls the fluid control devices 50(1), the fluid control device 50(2), and so on. Such a configuration 400 may be appropriate when both the motor controller that operates the motor 12 and the BMS that operates the storage pack 14 are not equipped to further control any fluid control devices 50 thus enabling a separate circuit to control the fluid control devices 50. Such a configuration 400 may also represent only the motor controller or only the BMS controlling the fluid control devices 50.

Other thermal management configurations are suitable for use as well. For example, the fluid control assembly 34 may utilize a hybrid configuration in which there is one controller 54 that controls just one fluid control device 50 (FIG. 9) and another controller 54 that controls multiple fluid control devices 50 (FIG. 10). As another example, the fluid control assembly 34 may utilize a configuration in which at least one fluid control device 50 uses a self-controlling actuator 62 (e.g., a bimetallic spring) to control a door 60 thus alleviating the need for electronic control which consumes power, and so on.

Figure 11:
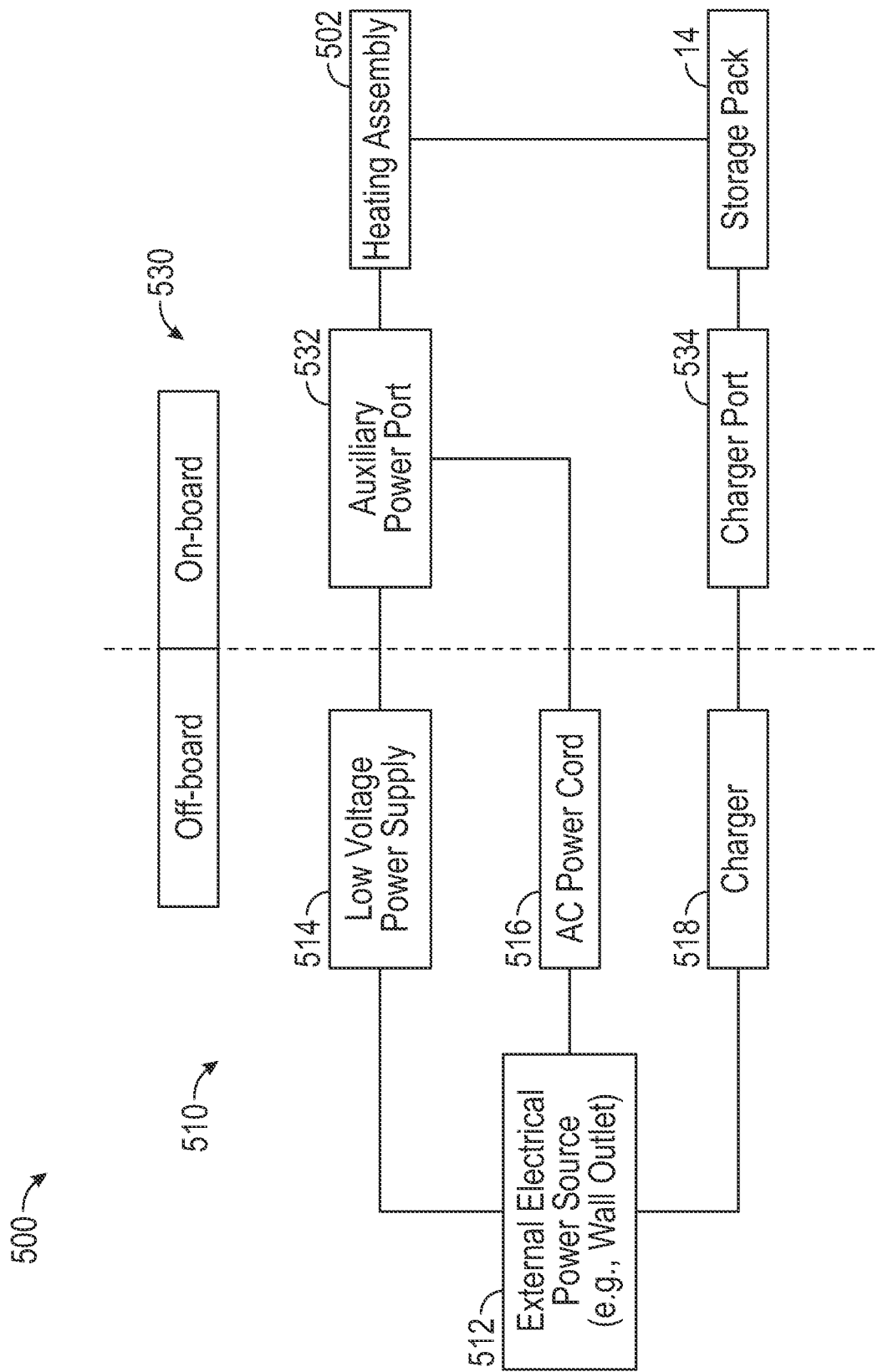
FIG. 11 is a block diagram of a heating system for the electric vehicle in accordance with certain embodiments.
Figure 12:
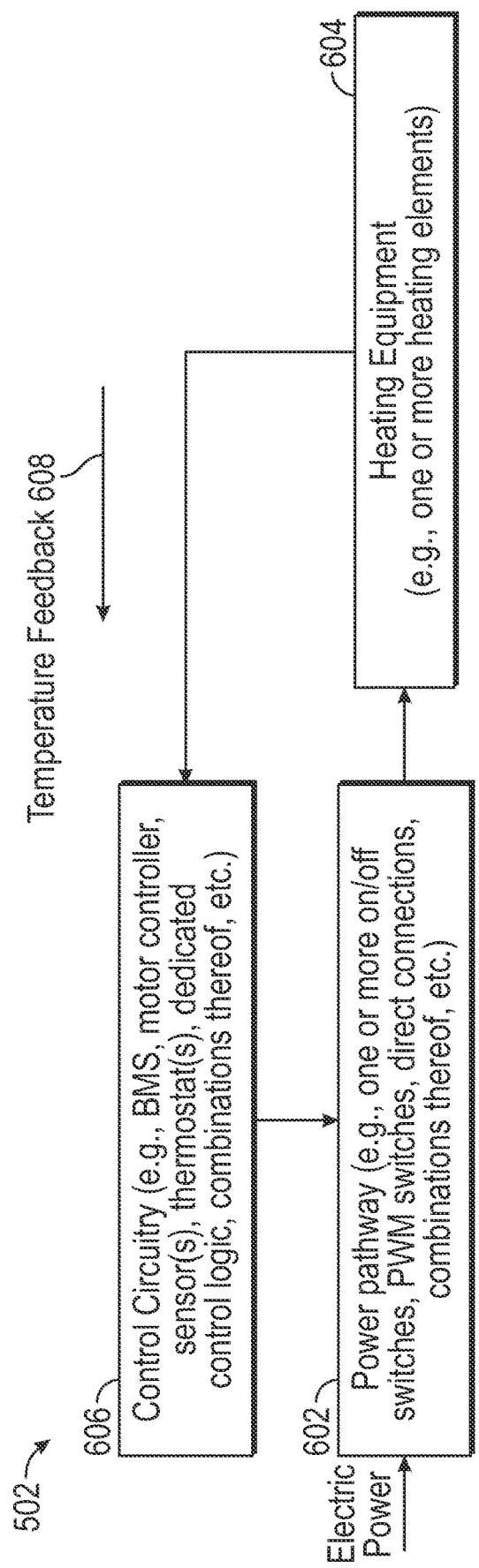
FIG. 12 is a block diagram showing certain details of the heating system in accordance with certain embodiments.
Figure 13:
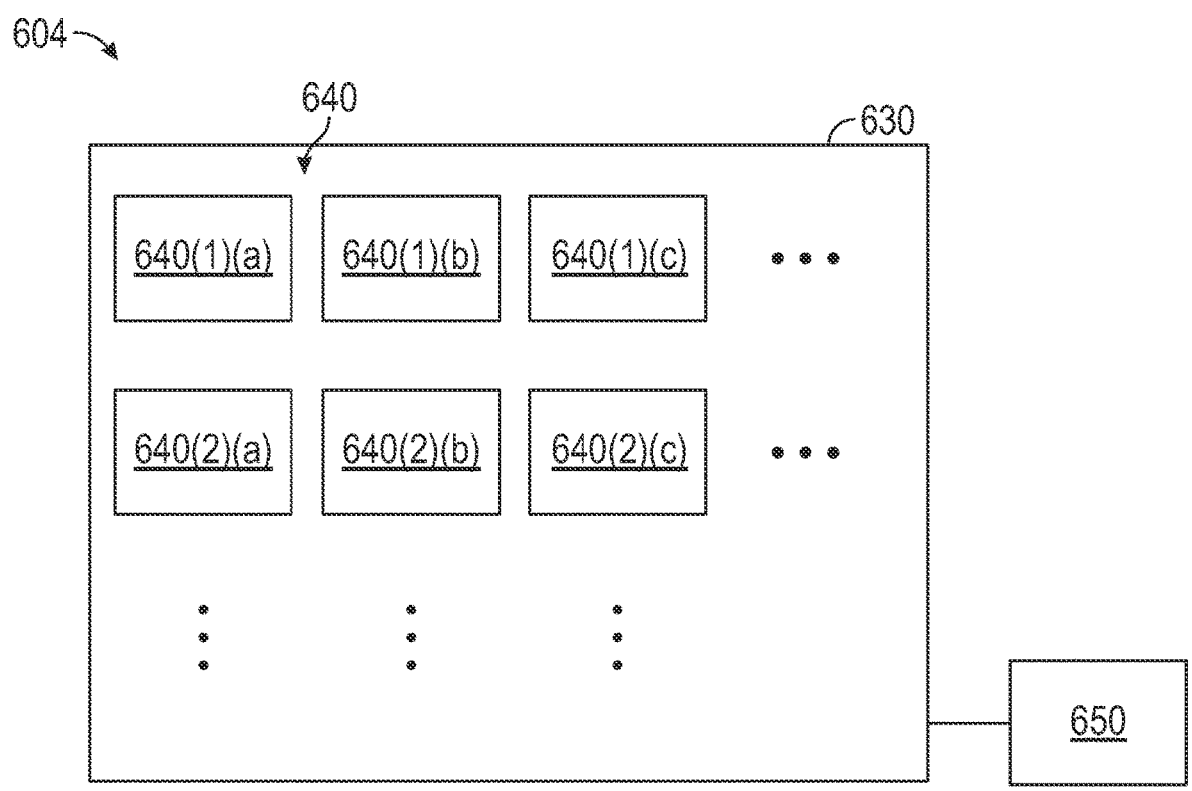
FIG. 13 is a block diagram showing further details of the heating system in accordance with certain embodiments.

FIGS. 11 through 13 show details of a heating system 500 for the electric snowmobile 10. FIG. 11 shows multiple ways electric power may be provided to a heating assembly 502 of the heating system 500 in accordance with certain embodiments. FIG. 12 shows certain heating assembly details in accordance with certain embodiments. FIG. 13 shows additional heating assembly details in accordance with certain embodiments.

As shown in FIG. 11, the heating system 500 includes certain off-board components 510 such as an external electrical power source (e.g., a wall outlet) 512, an intermediate low voltage power supply 514, an AC power cord 516, and a charger 518. The heating system 500 further includes certain on-board components 530 such as an auxiliary power port 532, a charger port 534, the heating assembly 502 (also see FIG. 12), and the storage pack 14 (also see FIG. 6). Some of the components 510, 530 of the heating system 500 may also belong to other systems of the snowmobile 10 as well (e.g., storage pack 14 may belong to the electric propulsion system of the snowmobile 10, and so on).

With the various components 510, 530 available as shown in FIG. 11, there are multiple ways to deliver power to the heating assembly 502. For example, electric power may be taken from the external electrical power source 512 and sent through the intermediate low voltage power supply 514 and the auxiliary power port 532 to the heating assembly 502. As another example, electric power may be taken from the external electrical power source 512 and sent directly through the AC power cord 516 (e.g., an extension cord) and the auxiliary power port 532 to the heating assembly 502. For these example ways, the auxiliary power port 532 serves as a dedicated power port connection, similar to but distinct from a charger port connection through the charger port 534. In accordance with certain embodiments, all power through the auxiliary power port 532 may be used for heating.

As another example, power from the external electrical power source 512 (i.e., wall power) may be conveyed to the heating assembly 502 via the charger 518 and the charger port 534 to keep the storage pack 14 fully charged while storage pack power is used for heating. As yet another example, if the storage pack 14 is disconnected from the external electrical power source 512 (e.g., the charger 518 is unplugged), the storage pack 14 is still able to deliver electric power to the heating assembly 502.

Although the charger 518 is shown in FIG. 11 as being off-board and interconnectable between the external electrical power source 512 and the charger port 534, the charger 518 may be on board in accordance with certain embodiments. In such embodiments, the charger 518 may reside between the charger port 534 and the storage pack 14.

There are a variety of ways to operate the heating assembly 502. For example, the heating assembly 502 may provide constant heat (e.g., always-on heat). Alternatively, the heating assembly 502 may provide binary heat (e.g., heat that is enabled/disabled by a switch, a thermostat, etc.). As another alternative, the heating assembly 502 may provide binary and/or varying heat (e.g., controlled by the BMS or other on-board computer). Moreover, such heat may be provided using dedicated (or zoned) active heating elements to precisely apply heat to specific portions of the storage pack 14.

As shown in FIG. 12, the heating assembly 502 includes a power pathway 602 and heating equipment 604. In some arrangements, the heating assembly 502 further includes control circuitry 606 which receives temperature feedback 608 (e.g., via temperature sensors 52, also see FIG. 6).

During operation, the power pathway 602 conveys electric power from other heating system componentry (e.g., see the storage pack 14 and the auxiliary power port 532 in FIG. 11), to the heating equipment 604. In response to the electric power, the heating equipment 604 provides heat to the storage pack 14 thus warming the storage pack 14 and improving storage pack performance.

In some arrangements, the power pathway 602 is simply a direct connection to the heating equipment 604. Such a direction connection may include a power cable, bus bars, power terminals, combinations thereof, etc.

In other arrangements, the power pathway 602 includes a set of switching devices (i.e., one or more switching devices) which is controlled by the control circuitry 606. Various types of switches are suitable for use such as an on/off switch, a pulse width modulation device, a potentiometer or similar linear device, and so on.

In some arrangements, the power pathway 602 includes multiple switching devices which lead to respective heating elements within the heating equipment 604. The heating elements are constructed and arranged to provide heat to respective heating areas or zones thus enabling focused heating of targeted portions of the storage pack 14. Such targeted heating minimizes power consumption and provides heat to only the zones where heating is needed.

Additionally, the control circuitry 606 (also see the controllers 54 in FIGS. 6 and 9-10) may include circuitry of the BMS, the motor controller, one or more sensors, one or more thermostats, dedicated control logic, combinations thereof, and so on. Accordingly, the control circuitry 606 is capable of detecting one or more temperatures local to the storage pack 14, and able to appropriately actuate one or more switching devices to power the heating equipment 604. For example, there may be a single heating 'zone' and one or more heating elements are all switched in unison, or there may be multiple 'zones' and each zone has its heating element(s) switched independently based on temperature feedback for that zone.

Furthermore, although the temperature feedback 608 is shown in FIG. 12 as coming from the heating element 604, the temperature feedback 608 may come from other sources in addition to or instead of the heating element 604. For example, the control circuitry 606 may include one or more sensors 52 disposed along the plenum 42 residing at various locations within the storage pack housing 32, and/or in contact with different portions of the storage pack 14.

In an embodiment, the heating assembly 502 may include, as the heating equipment 604, a grid of resistive wires that is disposed within the storage pack housing 32 and is configured to maintain the temperature of the storage pack 14 between a lower temperature threshold and an upper temperature threshold.

In an embodiment, the heating assembly 502 is configured to draw electrical power from the storage pack 14 in certain situations. For example, the heating assembly 502 may be configured to draw electrical power from the storage pack 14 when an external electrical power supply 512 such as a wall outlet is not available, or it may draw electrical power from the storage pack 14 even when the storage pack 14 is being recharged by an external power supply. The heating assembly 502 may be configured to turn off when a state of charge (SoC) of the storage pack 14 falls below a SoC threshold in order to preserve energy in the storage pack 14. The SoC threshold may be adjusted based on environmental factors, such as air temperature, operational factors, such as rate of discharge, to maximize usable range of the electric snowmobile 10.

In an embodiment, the electric snowmobile 10 includes, as the charger port 534, a charging port conforming to Society of Automotive Engineers (SAE) Standard J1772. The heating assembly 502 is configured to draw electrical power from the electrical power source 512 through the charger port 534, e.g., via the charger 518. The heating assembly 502 may be controlled by a thermal switch, an electronic controller, or may be formed of a resistive material with a positive temperature coefficient to regulate the heating element to keep the temperature of the storage pack from exceeding the upper temperature threshold.

In an embodiment, the electric snowmobile 10 includes an auxiliary power port 532 in addition to the charging port 534 that is separate and distinct from the charging port 534. This auxiliary power port 532 may be configured to conform a typical household electrical connection standard, e.g., National Electrical Manufacturers Association (NEMA) Standard 1-15P or 1-20P. The heating assembly 502 is configured to draw electrical power from the electrical power source 512 directly through the auxiliary power port 532. Alternatively, electrical power may pass through the intermediate low voltage power supply 514 before connection with the dedicated auxiliary power port 532. This auxiliary power port 532 may provide a benefit of keeping the storage pack 14 warmed when the electric snowmobile 10 is temporarily unused and away from a charging station. The power from this auxiliary power port 532 would also need to be similarly regulated to prevent the temperature of the storage pack 14 from exceeding the upper temperature threshold.

In an embodiment and as shown in FIG. 13, the heating equipment 604 includes a framework (or supporting structure) 630 which is subdivided into a plurality of individual zones 640(1)(a), 640(1)(b), 640(1)(c), . . . , 640(2)(a), 640(2)(b), 640(2)(c), . . . (collectively, zones 640). Each zone has a respective heating element. A temperature one of the individual zones 640 in the plurality of individual zones 640 can be controlled separately from a temperature of a different individual zone 640 in the plurality of individual zones 640. The temperature of each zone 640 may be monitored separately. The zoning of the heating equipment 604 may provide the benefit of heating of the cells (or battery units) that need to be heated, e.g., cells on the perimeter of the storage pack 14, without heating other cells that do not currently need to be heated. This may be a particular benefit when the heating equipment 604 is powered solely by the storage pack 14.

In an embodiment, the heating equipment 604 may be controlled by an electronic thermal controller 650 which is formed by the power pathway 602 and/or the control circuitry 606 of the heating assembly 502 (also see FIG. 12). The heating equipment 604 may be in operation whenever the connected to the external power source 512, may be thermostatically controlled based on the air temperature within the storage pack housing 32, or the temperature of the heating equipment 604 may be varied using a feedback controller, such as a proportional-integral controller, and varying the voltage or pulse width modulating the electrical power delivered to the heating equipment 604. This electronic thermal controller 650 may be a stand-alone controller or may be integrated into another electronic controller, such as the battery monitoring system or the motor controller (also see the control circuitry 606 and the power pathway 602 in FIG. 12).

FIGS. 14 through 19 show various configurations provided by the electric snowmobile 10 when regulating temperature of the motor 12 and the storage pack 14. Recall that it was explained earlier that the plenum 42 does not need to be a straight run as shown in FIGS. 6 to 8. Rather, in accordance with certain embodiments and as shown in FIGS. 14-19, the plenum 42 is not straight and, instead moves to accommodate various vehicle components (e.g., frame portions, body panels, devices, etc.) and/or geometries (e.g., for a particular streamlined profile, for symmetry, etc.) in the context of a particular vehicle application such as an electric snowmobile.

Figure 14:
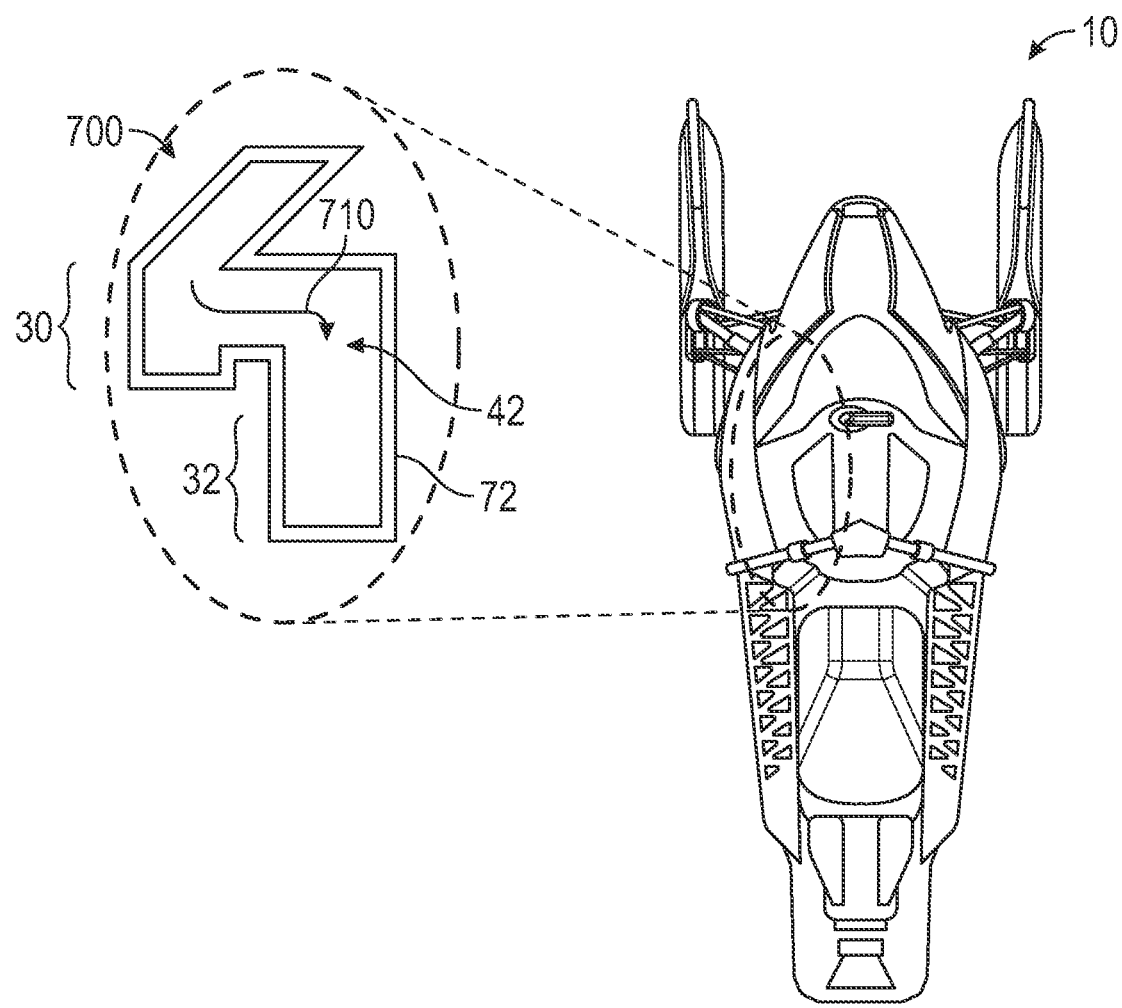
FIG. 14 is a diagram showing certain thermal management details for the electric vehicle in accordance with certain embodiments.

As shown in the inset 700 of FIG. 14, the plenum 42 of the electric snowmobile 10 is irregular in shape to accommodate a front-side location of the snowmobile 10. During operation, the doors 60 of the fluid control assembly 34 (also see FIGS. 6-8) along the plenum 42 may be in various positions or states (e.g., opened, closed, partially opened, etc.) depending on the situation. In some situations, the doors 60 are positioned to enable fluid flow from the motor housing 30 to the storage pack housing 32 (also see the arrow 710 in the inset 700 of FIG. 14).

Figure 15:
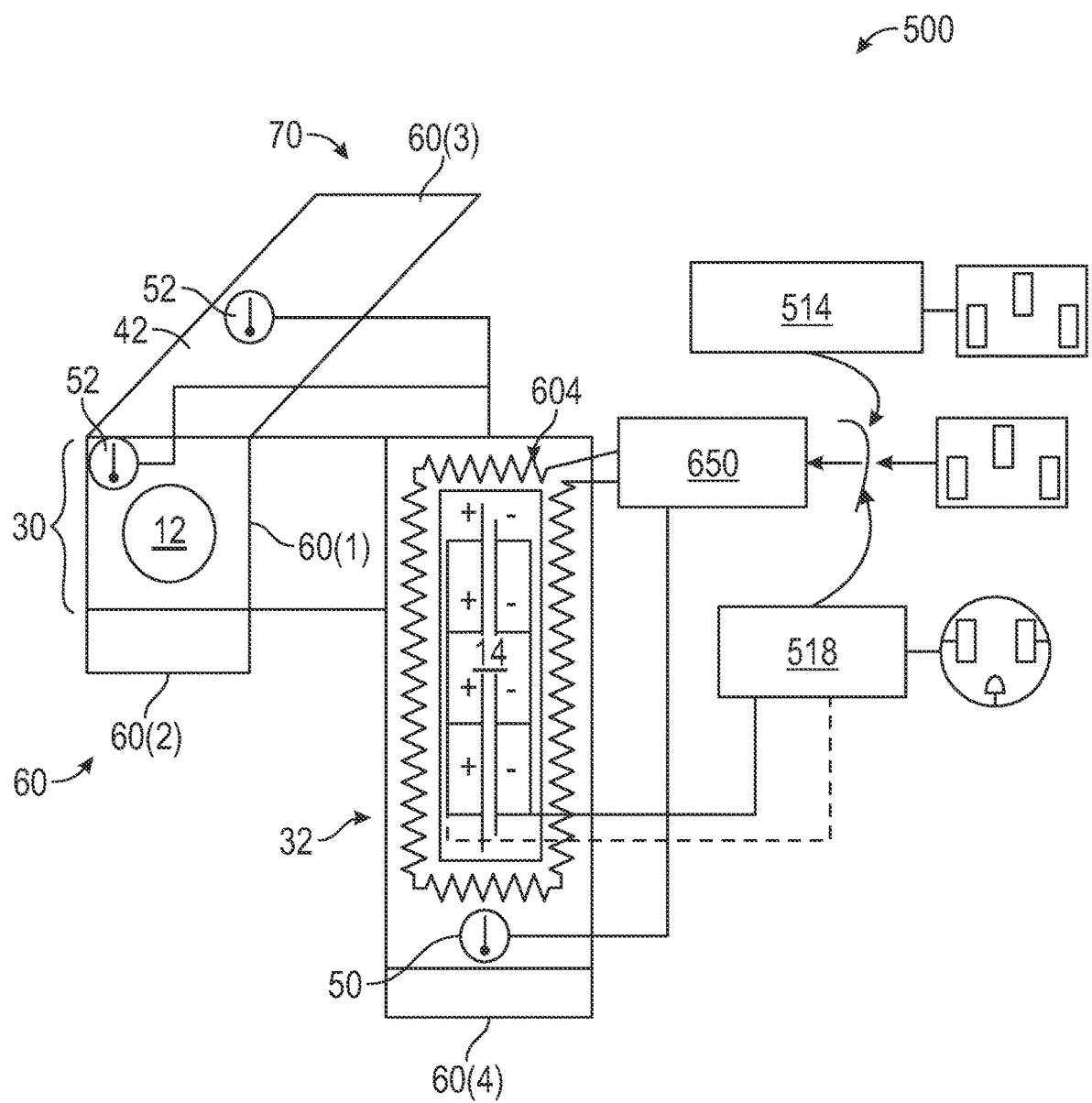
FIG. 15 is a diagram showing additional thermal management details for the electric vehicle in accordance with certain embodiments.

FIG. 15 shows at least a portion of the motor 12 residing within the motor housing 30, and at least a portion of the storage pack 14 residing within the storage pack housing 32. FIG. 15 further shows certain example locations for temperature sensors 52 along the plenum 42 and how certain components of the heating system 500 (also see FIGS. 11-12) may be involved in heating the storage pack 14.

By way of example and as shown in FIG. 15, the doors 60 of the fluid control assembly 34 along the plenum 42 are in closed positions. Such a situation may exist when the vehicle 10 turned off or is stationary/unused for an extended period of time. In such a situation, there is no waste heat from the motor 12 and no heat provided by the heating system 500.

Figure 16:
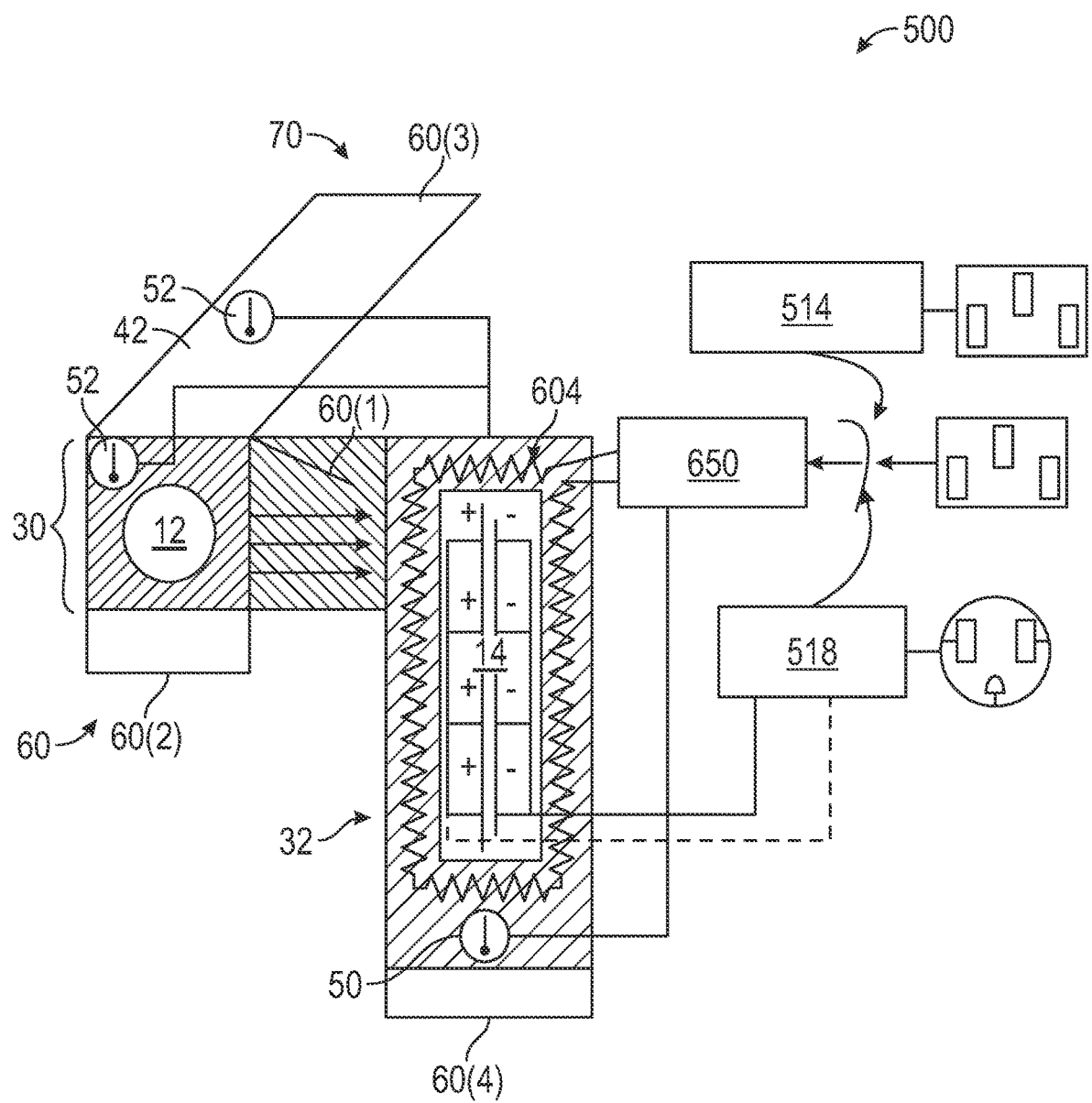
FIG. 16 is a diagram showing further thermal management details for the electric vehicle in accordance with certain embodiments.

As shown in FIG. 16, the door 60(1) between the motor housing 30 and the storage pack housing 32 is opened thus enabling heat to escape from the motor housing 30 into the storage pack housing 32. Such a situation may exist when the motor 12 is warm and the vehicle 10 is either stationary or moving.

As further shown in FIG. 16, the other doors 60(2), 60(3), and 60(4) of the fluid control assembly 34 along the plenum 42 are still closed thus blocking fluid flow into the motor housing 12 from the ambient environment and blocking fluid flow out of the motor housing 12 and the storage pack housing 32 into the ambient environment. Here, the fluid control assembly 34 closes the doors 60(2), 60(3), and 60(4) to maximize warming of the storage pack 14 using waste heat from the motor 12. That is, the motor housing 30 and the storage pack housing 32 form a contiguous enclosed space such that heat is allowed to simply leak (or permeate) from the motor housing 30 into the storage pack housing 32 to warm the storage pack 14. Accordingly, any heat from the motor 12 remains captured for use in heating the storage pack 14 without powering the heating equipment 604 using charge from the storage pack 14. Thus, the performance (e.g., capacity, charging speed, etc.) of the storage pack 14 is improved.

Figure 17:
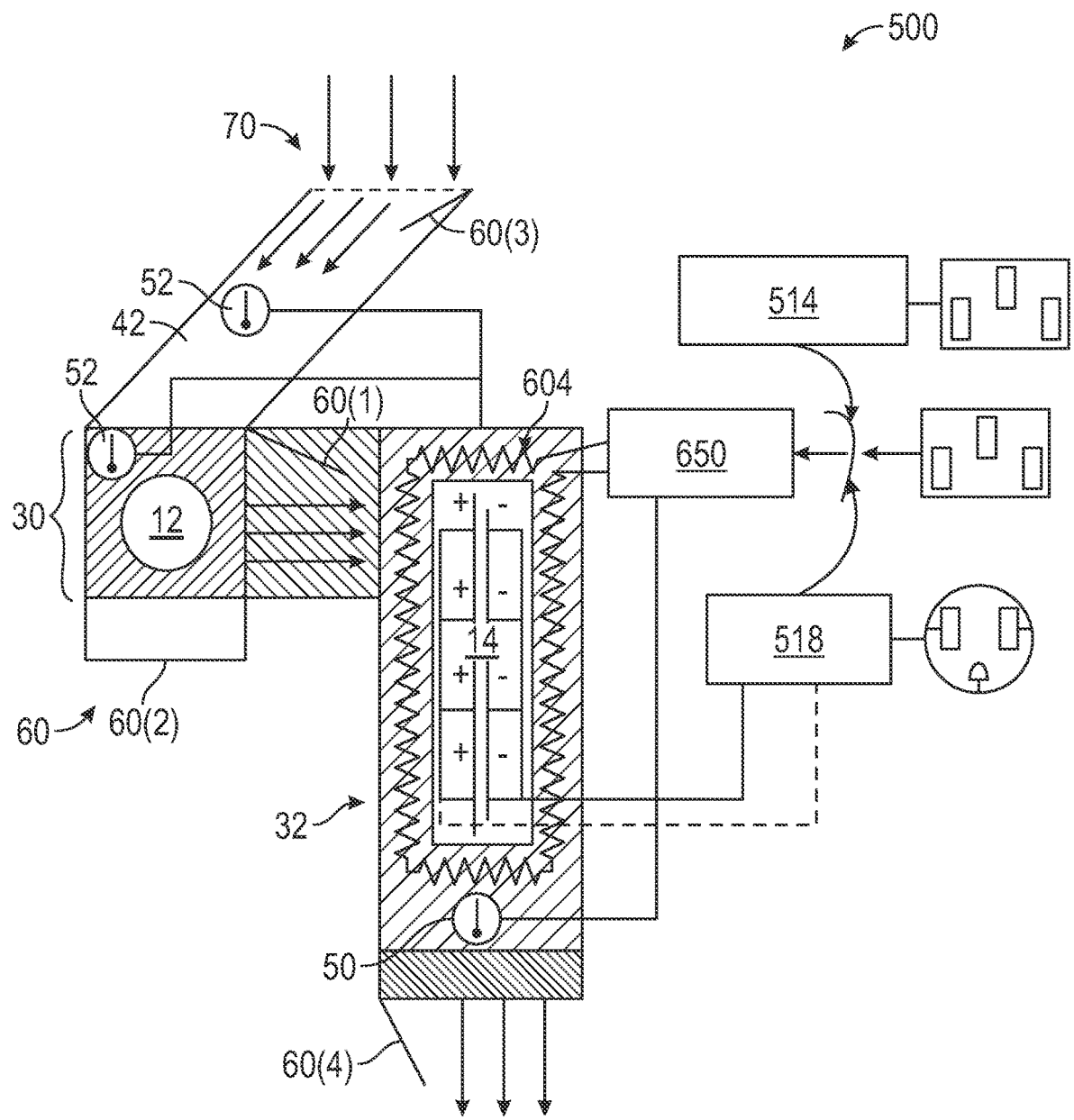
FIG. 17 is a diagram showing yet further thermal management details for the electric vehicle in accordance with certain embodiments.

As shown in FIG. 17, the doors 60(1), 60(3), and 60(4) are opened. The opened door 60(3) allows air in front of the forward-facing intake vent 70 to enter the plenum 42. The opened door 60(1) between the motor housing 30 and the storage pack housing 32 allows that air to continue flowing through the motor housing 30 and into the storage pack housing 32. The opened door 60(4) at the back of the storage pack housing 32 allows air to continue flowing and eventually exit the plenum 42 (e.g., through a seat in order to warm the seat, through the rear of the vehicle, a direction other than back towards the motor 12, etc.).

Such a situation may exist when the motor 12 is too warm and the storage pack 14 is too cool. For example, a temperature sensor 52 in the motor housing 30 may indicate that the temperature within the motor housing 30 exceeds a predefined threshold, and another temperature sensor 52 in the storage pack housing 32 may indicate that the temperature within the storage pack housing 32 is below another predefined threshold. In such a situation, the air flow through the plenum 42 is stronger than if the doors 60(3) and 60(4) were not open. Accordingly, the air flow captures waste heat from the motor 12 thus reducing the temperature of the motor 12 and provides the waste heat to the storage pack 14 thus raising the temperature of the storage pack 14. As a result, the performance (e.g., capacity, charging speed, etc.) of the storage pack 14 is improved.

Figure 18:
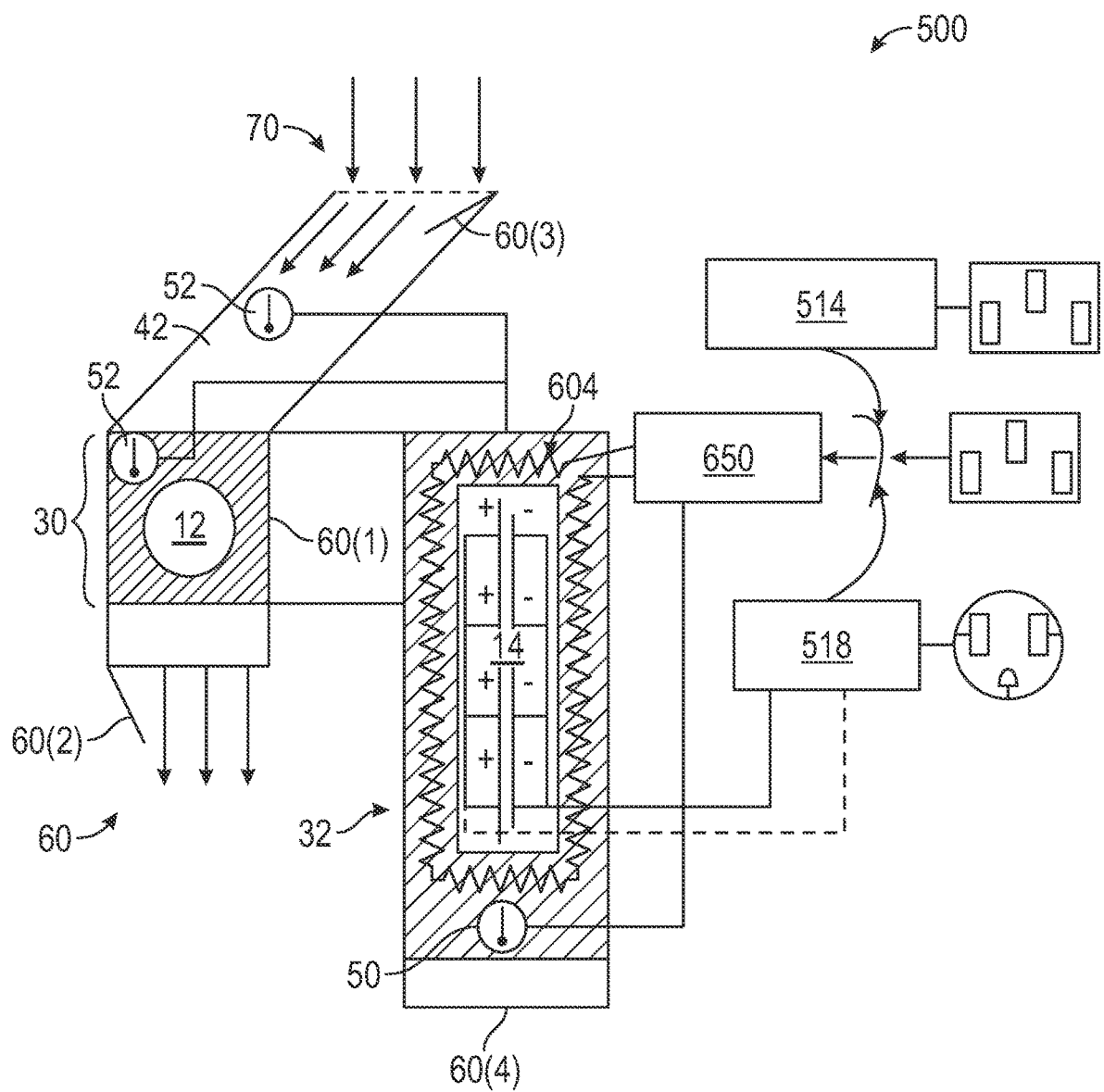
FIG. 18 is a diagram showing yet further thermal management details for the electric vehicle in accordance with certain embodiments.

As shown in FIG. 18, the doors 60(3) and 60(2) are opened, and the doors 60(1) and 60(4) are closed. The opened doors 60(3) and 60(2) allow air in front of the forward-facing intake vent 70 to release waste heat from the motor 12 that would otherwise collect in the motor housing 30. The closed doors 60(1) and 60(4) prevents air from flowing into (or through) the storage pack housing 32.

Such a situation may exist when the motor 12 is too warm and the storage pack 14 is at a normal operating temperature. For example, a temperature sensor 52 in the motor housing 30 may indicate that the temperature within the motor housing 30 exceeds a predefined threshold, and another temperature sensor 52 in the storage pack housing 32 may indicate that the temperature within the storage pack housing 32 is within a predefined normal operating range.

Figure 19:
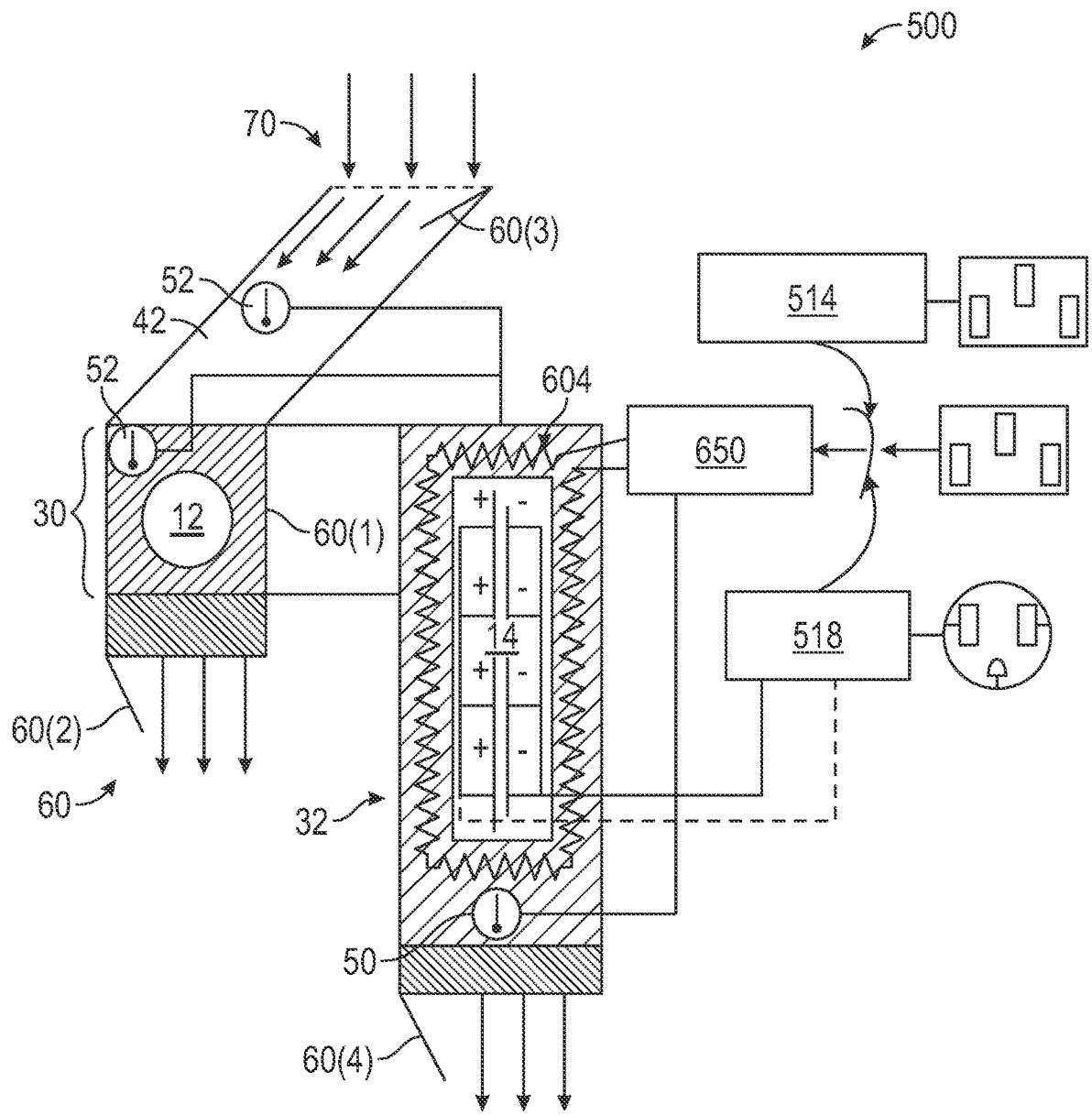
FIG. 19 is a diagram showing yet further thermal management details for the electric vehicle in accordance with certain embodiments.

As shown in FIG. 19, the doors 60(2), 60(3), and 60(4) are opened, and the door 60(1) is closed. The opened doors 60(3) and 60(2) allow air in front of the forward-facing intake vent 70 remove waste heat from the motor 12. The closed door 60(1) prevents air within the motor housing 30 from flowing into the storage pack housing 32. The opened door 60(4) allows heat to escape from the storage pack housing 32 thus reducing the temperature of the storage pack 14.

Such a situation may exist if the storage pack 14 gets too hot, e.g., one or more cells of the storage pack 14 is at its warming limit. For example, a temperature sensor 52 in the storage pack housing 32 may indicate that the temperature within the storage pack housing 32 exceeds a predefined threshold. In such a situation, independent of the motor housing 30, the storage pack housing 32 vents heat to the cooler ambient surroundings.

It should be understood that the arrangement of doors 60 among the plenum 42 is flexible and doors 60 may be added and/or removed at various locations to facilitate temperature management in accordance with certain embodiments. Along these lines, the door 60(4) is shown in FIG. 8 as being along a side of the plenum 42 which then continues past the storage pack 14 to provide further flow downstream (e.g., to heat a seat). Alternatively, the door 60(4) in FIGS. 15-19 is shown at an end of the plenum 42, thus enabling control of whether the flow from the plenum 42 exits downstream or perhaps elsewhere (e.g., adjacent the storage pack 14). Other door configurations, locations, etc. are suitable for use (e.g., a hybrid having a door 60 adjacent the storage pack 14 as well as another door 60 terminating the plenum 42), and so on.

A concern when operating an electric snowmobile is depleting the charge in the storage system before returning to a charging station. In order to address this concern, in one embodiment, the electric snowmobile 10 includes an electrical port electrically connected to the storage pack 14 and configured to draw electrical power from an electrical power source external to the snowmobile 10, e.g., a donor electric snowmobile, equipped with a compatible electrical port and deliver the electrical power directly to the storage pack 14. In some arrangements, this electrical port may be the charger port 541, and in other arrangements this electrical port is separate from the charger port 541. This electrical port allows the snowmobile 10 with a depleted storage pack, i.e., the recipient electric snowmobile 10 to return to a location with appropriate charging facilities. The electrical port of the recipient electric snowmobile 10 is connected to the electrical port of a donor snowmobile by an umbilical tether (or cable).

Figure 20:
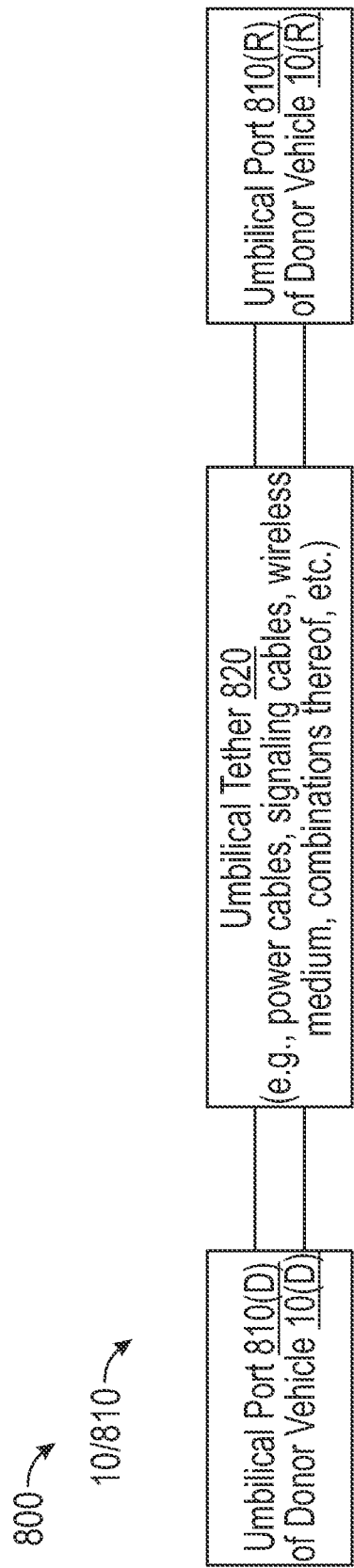
FIG. 20 is a diagram showing tethering details for multiple electric vehicles in accordance with certain embodiments.

FIG. 20 shows a tethering situation 800 between a donor snowmobile 10(D) and a recipient snowmobile 10(R). In particular, each snowmobile 10 includes an umbilical port 810. That is, the donor snowmobile 10(D) includes an umbilical port 810(D), and the recipient snowmobile 10(R) includes an umbilical port 810(R). Additionally, an umbilical tether 820 is interconnected between the donor snowmobile 10(D) and the recipient snowmobile 10(R).

In such a tethering situation 800, it is possible for both vehicles 10(R), 10(D) to operate. For example, both snowmobiles 10(R), 10(D) may drive over a surface while the recipient snowmobile 10(R) receives electric power from the donor snowmobile 10(D) through the umbilical 810.

To create the tethering situation 800, one end of the umbilical tether 820 connects to the donor snowmobile 10(D) and the opposite end of the umbilical tether 820 connects to the recipient snowmobile 10(R). Upon connection, the electronic circuits of both snowmobiles 10(D), 10(R) are able to access electric power from the storage pack 14 of the donor snowmobile 10(D). Since the electronic circuits of both snowmobiles 10(D), 10(R) are able to access electric power, the traction systems of both vehicles 10(D), 10(R) are capable of moving the vehicles 10 while certain conditions are satisfied.

In accordance with certain embodiments, tethering control circuitry in each of the snowmobiles 10 controls access to power among the snowmobiles 10. Along these lines, the tethering control circuitry of each snowmobile 10 may include a power switch that enables an operator to control whether the snowmobile 10 is to simply run on on-board electric power, receive electric power from a different snowmobile 10, or donate electric power to a different snowmobile 10.

In some arrangements, the tethering control circuitry includes safety and/or power conditioning circuitry (e.g., fuses, circuit breakers, control logic, combinations thereof, etc.) to prevent damage. Such safety circuitry may provide protection against certain types of configuration errors such as if both snowmobiles 10 are set to operate as donors of electric power.

During operation, the tethering control circuitry establishes a handshaking umbilical connection prior to enabling operation of their respective traction systems. Such tethering control circuitry may include dedicated circuitry, the electronic controller 54 of the fluid control assembly 34, the BMS, the motor controller, combinations thereof, and so on. Such a handshaking umbilical connection is not considered established (or live) until certain activities take place.

First, the snowmobiles 10 determine which snowmobile 10 is sourcing traction electric power. That is, the donor snowmobile 10(D) identifies itself as the snowmobile 10 supplying mobility electric power.

Second, the snowmobiles 10 determine which snowmobile 10 is receiving traction electric power. That is, the recipient snowmobile 10(R) identifies itself as the snowmobile 10 receiving mobility electric power.

Next, the snowmobiles 10 adjust (e.g., reduce or limit) their performance characteristics (e.g., current thresholds, speed thresholds, etc.) and exchange acknowledgements (e.g., messages). Such adjustment prevents overloading the storage pack 14 of the donor snowmobile 10(D).

Upon successful exchange of the acknowledgements, the handshaking umbilical connection is consider established. Accordingly, the traction systems of the snowmobiles 10 are enabled thus allowing the snowmobiles 10 to move.

In accordance with some embodiments, the traction systems become disabled if the handshaking umbilical connection is lost. For example, if a physical cable of the umbilical tether 820 disconnects from one of the umbilical ports 810, the tethering control circuitry of the snowmobiles 10 disables the respective traction systems of the snowmobiles 10.

By way of example and in accordance with certain embodiments, suppose that the electrical controller in the recipient snowmobile 10(R) is in communication with the motor 12, the storage pack 14, and the umbilical port 810(R). This electrical controller may be a stand-alone controller or may be integrated into another controller, such as the controller 54 of the fluid control assembly 34, circuitry of the battery monitoring system or circuitry of the motor controller. The electrical controller is configured to disconnect the storage pack 14 of the recipient snowmobile 10 from the motor 12 of the recipient snowmobile 10 and connect the umbilical port 810(R) with the motor 12 of the recipient snowmobile 10 when the umbilical port 810(R) is connected to the donor snowmobile 10(D) by the umbilical tether 820. This will help prevent an overcurrent condition from occurring due to the load of the depleted storage pack 14 in the recipient snowmobile 10(R). The umbilical port 810(R) also contains circuit protection circuitry configured to disconnect the umbilical port 810(R) from the electric propulsion motor 12 if an overcurrent condition occurs from an electrical current flowing through the umbilical port 810(R) exceeding a current threshold.

The electrical controller in the recipient snowmobile 10(R) may communicate with a corresponding electrical controller in the donor snowmobile 10(D) over the umbilical tether 820 to gracefully manage the power transfer between the recipient and the donor snowmobiles 10. Alternatively, this communication may be performed over a wireless link between the recipient and the donor snowmobiles 10. The electrical controllers may negotiate via the umbilical tether 820 to determine which snowmobile 10 is the donor and which snowmobile 10 is the recipient. The electrical controllers may also negotiate reduced performance limits of each snowmobile 10 to manage the current flowing through the umbilical tether 820 and maximize range while operating in the donor/recipient mode. Alternatively, the snowmobile 10 may have a switch to manually determine if the snowmobile 10 is operating in donor or recipient mode and to limit performance of the snowmobile 10 while in donor or recipient mode.

Figure 21:
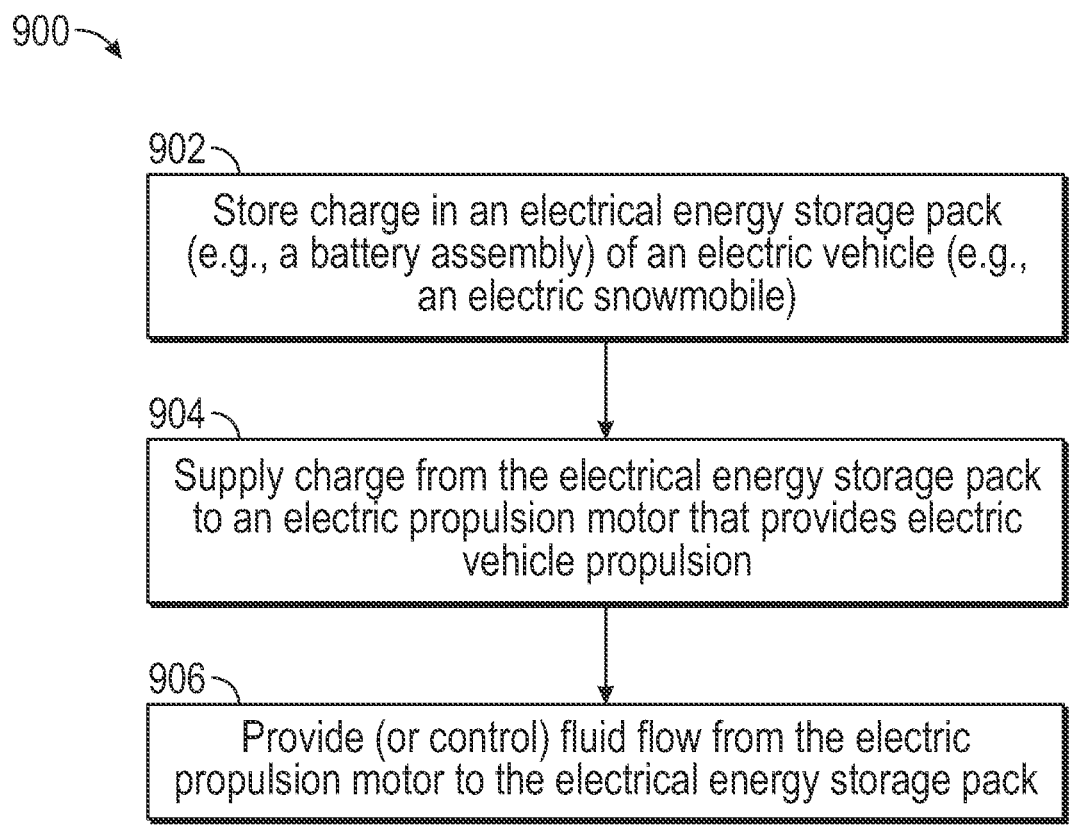
FIG. 21 is a flowchart of a procedure which is performed by an electric vehicle in accordance with certain embodiments.

FIG. 21 is a flowchart of a procedure 900 which is performed by componentry of an electric vehicle when providing thermal management to an electrical energy storage pack in accordance with certain embodiments. By way of example, the electric vehicle may take the form of an electric snowmobile residing in a cold weather environment. The componentry of the electric vehicle may include electronic circuitry, mechanical apparatus, electro-mechanical mechanisms, combinations thereof, etc. (e.g., see the other figures).

At 902, the componentry stores charge in an electrical energy storage pack of the vehicle. A suitable electrical energy storage pack is a battery assembly having a set of battery units (e.g., lithium-ion batteries, etc).

At 904, the componentry supplies charge from the electrical energy storage pack to an electric propulsion motor that provides electric vehicle propulsion. Accordingly, the electrical vehicle is able to move over a lower surface (e.g., an electric snowmobile is able to maneuver over snowy/icy/ground terrain).

At 906, the componentry provides (or controls) fluid flow from the electric propulsion motor to the electrical energy storage pack. Here, the fluid flow is able to capture waste heat from the electric propulsion motor and deliver the captured waste heat to the electrical energy storage pack. Accordingly, such controlled fluid flow is able to increase the temperature of the electrical energy storage pack using heat from the motor thus improving the electric performance of the electrical energy storage pack as well as the operating range of the vehicle.

As described above, improved techniques involve providing thermal management to an electrical energy storage pack 14 of a vehicle 10. Along these lines, fluid flow is controlled between an electric motor housing 30 and an electrical energy storage pack housing 32. The electric motor housing 30 encloses at least a portion of an electric motor 12 of the vehicle 10, and the electrical energy storage pack housing 32 encloses at least a portion of the electrical energy storage pack 14. During vehicle operation and in accordance with certain embodiments, fluid (gas or liquid) is directed through the electric motor housing 30 to capture heat from the electric motor 12 and is further directed through the electrical energy storage pack housing 32 to deliver the captured heat to the electrical energy storage pack 14. Accordingly, such controlled fluid flow is able to raise the temperature of the electrical energy storage pack 14 using heat from the electric motor 12 thus improving the electric power storage capacity of the electrical energy storage pack 14 as well as the operating range of the vehicle 10.

While various embodiments of the present disclosure have been particularly shown and described, it will be understood by those skilled in the art that various changes in form and details may be made therein without departing from the spirit and scope of the present disclosure as defined by the appended claims.

For example, the storage pack 14 was described above as being any type of energy storage assembly such as a set of rechargeable battery units or cells. In accordance with certain embodiments, suitable battery types include, but are not limited to, lithium ion, lead acid, nickel-cadmium, nickel-metal hydride, nickel-zinc, lithium-sulfur, graphene, aluminum-graphite, combinations thereof, and the like. Other rechargeable energy storage technologies are suitable for use as well.

Additionally, the fluid control assembly 34 was described above as having fluid control devices 50 that use doors 60 to control air flow. Other mechanisms are suitable for use in place of or in addition to the doors 60 such as fans, diaphragms, bellows, and so on. Moreover, the fluid may take forms other than air such as liquid, other gases, heat pipe mechanisms, combinations thereof, etc.

Furthermore, the vehicle 10 may not be a snowmobile but instead have a different form factor, different size/scale, different shape, different configuration, different layout, etc. For example, in accordance with certain embodiments, the drive track 18 does not include an endless track but instead includes a set of wheels, a set of propellers, combinations thereof, and so on. Such modifications and enhancements are intended to belong to various embodiments of the disclosure.

Embodiments of the present disclosure describe an electric snowmobile including an electric propulsion motor encased within a motor housing and an electrical energy storage pack, e.g., battery pack, encased within an energy storage housing, e.g., storage pack housing, and electrically connected to the electric propulsion motor. The motor housing is in fluid communication with the energy storage housing. A thermal control system is configured to allow waste heat from electric propulsion motor in the motor housing to be ducted to the energy storage housing when a temperature of the electrical energy storage pack fall below a lower temperature threshold, thereby warming the electrical energy storage pack. The electric snowmobile also includes a drive track operatively interconnected with the motor for delivering propulsive power.

Other embodiments of the present disclosure describe an electric snowmobile including an electric propulsion motor and an electrical energy storage pack electrically connected to the electric propulsion motor and encased within an energy storage housing. The electric snowmobile also includes an electrical thermal control system having a heating element disposed within the energy storage housing and configured to maintain the temperature of the electrical energy storage pack between the lower temperature threshold and an upper temperature threshold and a drive track operatively interconnected with the motor for delivering propulsive power.

Yet further embodiments of the present disclosure describe an electric snowmobile including an electric propulsion motor and an electrical energy storage pack configured to be in electrical communication with the electric propulsion motor. The electric snowmobile also includes an electrical port electrically connected to the electrical energy storage pack that can supply power via an umbilical cable to another electric snowmobile having a compatible electrical port to provide emergency electrical power to another snowmobile if its battery is depleted and is unable to recharge using a standard battery charger, e.g., out on a trail.

Yet other embodiments of the present disclosure describe an electric snowmobile including an electric propulsion motor, an electrical energy storage pack configured to be in electrical communication with the electric propulsion motor, and an electrical port electrically connected to the electrical energy storage pack and configured to draw electrical power from an electrical power source external to the snowmobile and deliver the electrical power to the electric propulsion motor. The electric snowmobile further includes a drive track operatively interconnected with the motor for delivering propulsive power.

In some arrangements, the thermal control system is configured to allow waste heat from electric propulsion motor in the motor housing to be ducted to the atmosphere when a temperature of the electric propulsion motor rises above a motor temperature threshold.

In some arrangements, the thermal control system is configured to allow waste heat from electrical energy storage pack in the energy storage housing to be ducted to the atmosphere when the temperature of the electrical energy storage pack rises above an upper temperature threshold.

In some arrangements, the electric snowmobile further includes an electrical thermal control system having a heating element disposed within the energy storage housing and configure to maintain the temperature of the electrical energy storage pack between the lower temperature threshold and an upper temperature threshold.

In some arrangements, the heating element is configured to draw electrical power from the electrical energy storage pack.

In some arrangements, the heating element is configured to draw electrical power from an electrical power source external to the snowmobile.

In some arrangements, the electric snowmobile further includes a charging port in electrical communication with the electrical energy storage pack and configured to draw electrical power from the electrical power source external to the snowmobile. The heating element draws electrical power through the charging port.

In some arrangements, the electric snowmobile further includes a charging port in electrical communication with the electrical energy storage pack and configured to draw electrical power from the electrical power source external to the snowmobile. The electric snowmobile further includes an auxiliary electrical port distinct from the charging port and configured to draw electrical power from the electrical power source external to the snowmobile, wherein the heating element draws electrical power through the auxiliary electrical port.

In some arrangements, the heating element is subdivided into a plurality of individual zones and wherein a temperature one of the individual zones can be controlled separately from a temperature of a different individual zone.

In some arrangements, the motor housing and the energy storage housing contain thermal insulation.

In some arrangements, the electrical power source external to the snowmobile is another donor electric snowmobile and wherein the electrical port is configured to be connected to the donor snowmobile by an umbilical tether.

In some arrangements, the electric snowmobile further includes an electrical controller in communication with the electrical propulsion motor. The electrical energy storage pack, and the electrical port, wherein the electrical controller is configured to disconnect the electrical energy storage pack from the electric propulsion motor and the electrical port when the electrical port is connected to the donor snowmobile by the umbilical tether.

In some arrangements, the electrical port contains circuit protection circuitry configured to disconnect the electrical port from the electric propulsion motor when an electrical current flowing through the electrical port exceeds a current threshold.

The scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

What is claimed is:

1. An electric vehicle, comprising:
    an electric propulsion motor constructed and arranged to provide vehicle propulsion using electric power;
    an electrical energy storage pack constructed and arranged to supply electric power to the electric propulsion motor; and
    a ducting system coupled with the electric propulsion motor and the electrical energy storage pack, the ducting system including:
        a motor housing constructed and arranged to house at least a portion of the electric propulsion motor,
        a storage pack housing coupled with the motor housing, the storage pack housing being constructed and arranged to house at least a portion of the electrical energy storage pack,
        a fluid control assembly constructed and arranged to control fluid flow between the motor housing and the storage pack housing, and
        a forward-facing intake vent constructed and arranged to channel air that is initially outside the vehicle into the motor housing as the vehicle moves forward.

2. The electric vehicle of claim 1 wherein the motor housing and the storage pack housing of the ducting system form at least a portion of a plenum extending from the electric propulsion motor to the electrical energy storage pack; and
    wherein the fluid control assembly of the ducting system includes a set of doors disposed along the plenum.

3. The electric vehicle of claim 2 wherein the fluid control assembly further includes:
    a set of controllers coupled with the set of doors, the set of controllers being constructed and arranged to operate the set of doors.

4. The electric vehicle of claim 3 wherein the set of controllers includes:
    a central controller constructed and arranged to transition at least some of the set of doors between open and closed positions in response to sensed temperature within the plenum.

5. The electric vehicle of claim 3 wherein the set of controllers includes:
    door-specific controllers constructed and arranged to transition respective doors of the set of doors between open and closed positions in response to sensed temperature within the plenum.

6. The electric vehicle of claim 1 wherein the set of doors includes:
    an intake door coupled with the forward-facing intake vent, the intake door being constructed and arranged to control airflow through the forward-facing intake vent; and
    wherein the set of controllers includes:
        a controller constructed and arranged to operate the intake door in response to sensed temperature within a motor space defined by the motor housing.

7. The electric vehicle of claim 3 wherein the set of doors includes:
    an intermediate door disposed along the plenum between the motor housing and the storage pack housing, the intermediate door being constructed and arranged to control airflow between a motor space defined by the motor housing and a storage pack space defined by the storage pack housing.

8. The electric vehicle of claim 7 wherein the set of controllers includes:
    a controller constructed and arranged to operate the intermediate door in response to sensed temperature within the storage pack housing.

9. The electric vehicle of claim 3 wherein the set of doors includes:
    a motor vent door coupled with the motor housing, the motor vent door being constructed and arranged to exhaust airflow from a motor space defined by the motor housing.

10. The electric vehicle of claim 9 wherein the set of controllers includes:
    a controller constructed and arranged to operate the motor vent door in response to sensed temperature within the motor housing.

11. The electric vehicle of claim 3 wherein the set of doors includes:
    a storage pack vent door coupled with the storage pack housing, the storage pack vent door being constructed and arranged to allow air to escape from a storage pack space defined by the storage pack housing.

12. The electric vehicle of claim 11 wherein the set of controllers includes:
    a controller constructed and arranged to operate the storage pack vent door in response to sensed temperature within the storage pack housing.

13. The electric vehicle of claim 2, further comprising:
removable thermal insulation sections constructed and arranged to install along at least a portion of the plenum to minimize heat loss along the plenum when the removable thermal insulation sections are installed.

14. The electric vehicle of claim 1, further comprising:
heating equipment disposed within the storage pack housing, the heating equipment being constructed and arranged to maintain a temperature of the electrical energy storage pack above a predefined low temperature threshold and below a predefined high temperature threshold.

15. The electric vehicle of claim 14 wherein the electrical energy storage pack includes battery units; and
wherein the heating equipment includes:
zone elements coupled with respective battery units of the electrical energy storage pack, and
control circuitry that individually operates the zone elements to maintain temperature uniformity among the battery units.

16. The electric vehicle of claim 14 wherein the heating equipment is constructed and arranged to draw electrical power from the electrical energy storage pack when the electrical energy storage pack is being recharged from an external power supply;
wherein the heating equipment is constructed and arranged to draw electrical power from the electrical energy storage pack when the electrical energy storage pack is not being recharged from an external power supply and the electrical energy storage pack has a state of charge that exceeds a predefined threshold; and
wherein the heating equipment is constructed and arranged to draw electrical power from an auxiliary electrical port when electrical power is available from the auxiliary electrical port.

17. The electric vehicle of claim 1, further comprising:
an umbilical port constructed and arranged to electrically connect with a donor vehicle; and
tethering control circuitry coupled with the umbilical port, the tethering control circuitry being constructed and arranged to electrically disconnect the electrical energy storage pack from the electric propulsion motor when the electrical port electrically connects with the donor vehicle and the donor vehicle provides electric power to the electric propulsion motor through the umbilical port.

18. The electric vehicle of claim 1, further comprising:
an electric snowmobile drive track coupled with the motor enabling the electric vehicle to operate over terrain as an electric snowmobile.

19. The electric vehicle of claim 1, wherein the ducting system further includes (i) a first exhaust vent disposed on the motor housing, the first exhaust vent being constructed and arranged to channel exhaust air from inside the motor housing to outside the vehicle and (ii) a second exhaust vent disposed between the motor housing and the storage pack housing, the second exhaust vent being constructed and arranged to channel exhaust air from inside the motor housing into the storage pack housing.

20. The electric vehicle of claim 1, further comprising:
a straddle seat disposed above at least a portion of the storage pack housing; and
wherein the ducting system further includes an exhaust vent positioned beneath the straddle seat, the exhaust vent being constructed and arranged to channel exhaust air from the storage pack housing to the straddle seat to provide thermal convection with the straddle seat.

21. The electric vehicle of claim 1, further comprising:
at least one ground-engaging member coupled with the electric propulsion motor, the at least one ground-engaging member being constructed and arranged to move the electric vehicle in response to drive from the electric propulsion motor and to provide forced induction of air into the forward-facing intake vent as the electric vehicle moves forward.

22. A method of operating an electric vehicle, the method comprising:
storing charge in an electrical energy storage pack of the electric vehicle;
supplying charge from the electrical energy storage pack to an electric propulsion motor that provides vehicle propulsion; and
providing fluid flow from the electric propulsion motor to the electrical energy storage pack to allow waste heat from the electric propulsion motor to warm the electrical energy storage pack;
wherein the electric vehicle includes a ducting system coupled with the electric propulsion motor and the electrical energy storage pack, the ducting system including:
a forward-facing intake vent constructed and arranged to channel air that is initially outside the vehicle into the motor housing as the vehicle moves forward.

* * * * *